United States Patent
Louch et al.

(10) Patent No.: US 10,394,449 B2
(45) Date of Patent: Aug. 27, 2019

(54) DYNAMIC FUNCTION ROW MANAGEMENT

(71) Applicant: Apple Inc., Cupertino, CA (US)

(72) Inventors: John O. Louch, Boulder, CO (US);
Kevin J. Van Vechten, Montecito, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 15/436,338

(22) Filed: Feb. 17, 2017

(65) Prior Publication Data

US 2018/0088799 A1 Mar. 29, 2018

Related U.S. Application Data

(60) Provisional application No. 62/399,007, filed on Sep. 23, 2016.

(51) Int. Cl.
*G06F 3/0489* (2013.01)
*G06F 1/16* (2006.01)
*G06F 3/023* (2006.01)

(52) U.S. Cl.
CPC .......... *G06F 3/0489* (2013.01); *G06F 1/1662* (2013.01); *G06F 3/0238* (2013.01)

(58) Field of Classification Search
CPC ....... G06F 3/0488; G06F 3/041; G06F 3/0489
See application file for complete search history.

(56) References Cited

U.S. PATENT DOCUMENTS

| | | | |
|---|---|---|---|
| 5,181,029 A | 1/1993 | Kim | |
| 5,387,042 A | 2/1995 | Brown | |
| 5,644,737 A | 7/1997 | Tuniman et al. | |
| 5,867,729 A | 2/1999 | Swonk | |
| 6,232,972 B1 | 5/2001 | Arcuri et al. | |
| 7,620,905 B2 | 11/2009 | Boss et al. | |
| 7,802,206 B1 | 9/2010 | Davis et al. | |
| 7,882,448 B2 | 2/2011 | Haug | |
| 7,907,123 B2 | 3/2011 | Gil-Gomez | |
| 8,140,993 B2 | 3/2012 | Balasubramanian | |
| 8,321,810 B2 | 11/2012 | Heintze | |
| 8,411,039 B2 | 4/2013 | Guo et al. | |
| 8,819,585 B2 | 8/2014 | Sareen et al. | |
| 9,904,437 B2 * | 2/2018 | Costenaro | G06F 9/453 |
| 2002/0063691 A1 | 5/2002 | Rogers et al. | |
| 2002/0191029 A1 | 12/2002 | Gillespie et al. | |
| 2004/0021681 A1 | 2/2004 | Liao | |
| 2004/0257335 A1 | 12/2004 | Numano | |
| 2006/0123353 A1 * | 6/2006 | Matthews | G06F 3/0481 715/779 |
| 2006/0190838 A1 | 8/2006 | Nadamoto | |
| 2006/0224989 A1 | 10/2006 | Pettiross et al. | |
| 2007/0180398 A1 | 8/2007 | McArdle | |
| 2008/0046100 A1 | 2/2008 | Balasubramanian | |
| 2008/0082937 A1 | 4/2008 | Bennah et al. | |
| 2008/0225006 A1 | 9/2008 | Ennadi | |

(Continued)

FOREIGN PATENT DOCUMENTS

WO 2015/112868 A1 7/2015

*Primary Examiner* — David E Choi

(74) *Attorney, Agent, or Firm* — Invoke

(57) ABSTRACT

A device may include a dynamic function row (DFR) comprising a touchscreen. A device processor may operate a DFR agent controlling the DFR. The DFR agent may generate and/or select images to display on the DFR based on rules and/or contexts, and the DFR may display the images.

24 Claims, 20 Drawing Sheets

(56) References Cited

U.S. PATENT DOCUMENTS

| | | |
|---|---|---|
| 2009/0315867 A1 | 12/2009 | Sakamoto et al. |
| 2010/0107123 A1 | 4/2010 | Sareen et al. |
| 2010/0265183 A1 | 10/2010 | Mail et al. |
| 2010/0313156 A1 | 12/2010 | Louch et al. |
| 2011/0047459 A1 | 2/2011 | Van Der Westhuizen |
| 2011/0055541 A1 | 3/2011 | Lee et al. |
| 2011/0131532 A1* | 6/2011 | Russell ............... G06F 3/04817 715/835 |
| 2011/0307810 A1* | 12/2011 | Hilerio .................. G06F 3/0481 715/760 |
| 2011/0307880 A1* | 12/2011 | Hilerio ...................... G06F 8/61 717/171 |
| 2011/0310030 A1* | 12/2011 | Mundt .................. G06F 1/1647 345/173 |
| 2012/0054778 A1* | 3/2012 | Russell ................. G06F 3/0481 719/328 |
| 2012/0110497 A1 | 5/2012 | Gimpl et al. |
| 2012/0131495 A1 | 5/2012 | Goossens et al. |
| 2013/0076591 A1 | 3/2013 | Sirpal et al. |
| 2013/0104062 A1 | 4/2013 | Reeves et al. |
| 2013/0152007 A1* | 6/2013 | Costenaro ............. G06F 3/0481 715/779 |
| 2013/0152015 A1* | 6/2013 | Costenaro ............. G06F 3/0482 715/808 |
| 2013/0332869 A1 | 12/2013 | Ferry et al. |
| 2014/0089650 A1 | 3/2014 | Polzin et al. |
| 2014/0149927 A1 | 5/2014 | Yoon |
| 2015/0074525 A1* | 3/2015 | Costenaro ............... G06F 9/453 715/711 |
| 2015/0268927 A1 | 9/2015 | Stewart et al. |
| 2015/0370339 A1 | 12/2015 | Ligtenberg et al. |
| 2015/0378546 A1 | 12/2015 | Osborne et al. |
| 2017/0063962 A1 | 3/2017 | Padmanabhan et al. |
| 2017/0249072 A1 | 8/2017 | Martin et al. |
| 2017/0285894 A1 | 10/2017 | Barrus et al. |
| 2017/0322592 A1 | 11/2017 | Chen et al. |
| 2018/0088799 A1* | 3/2018 | Louch ................... G06F 3/0489 |

\* cited by examiner

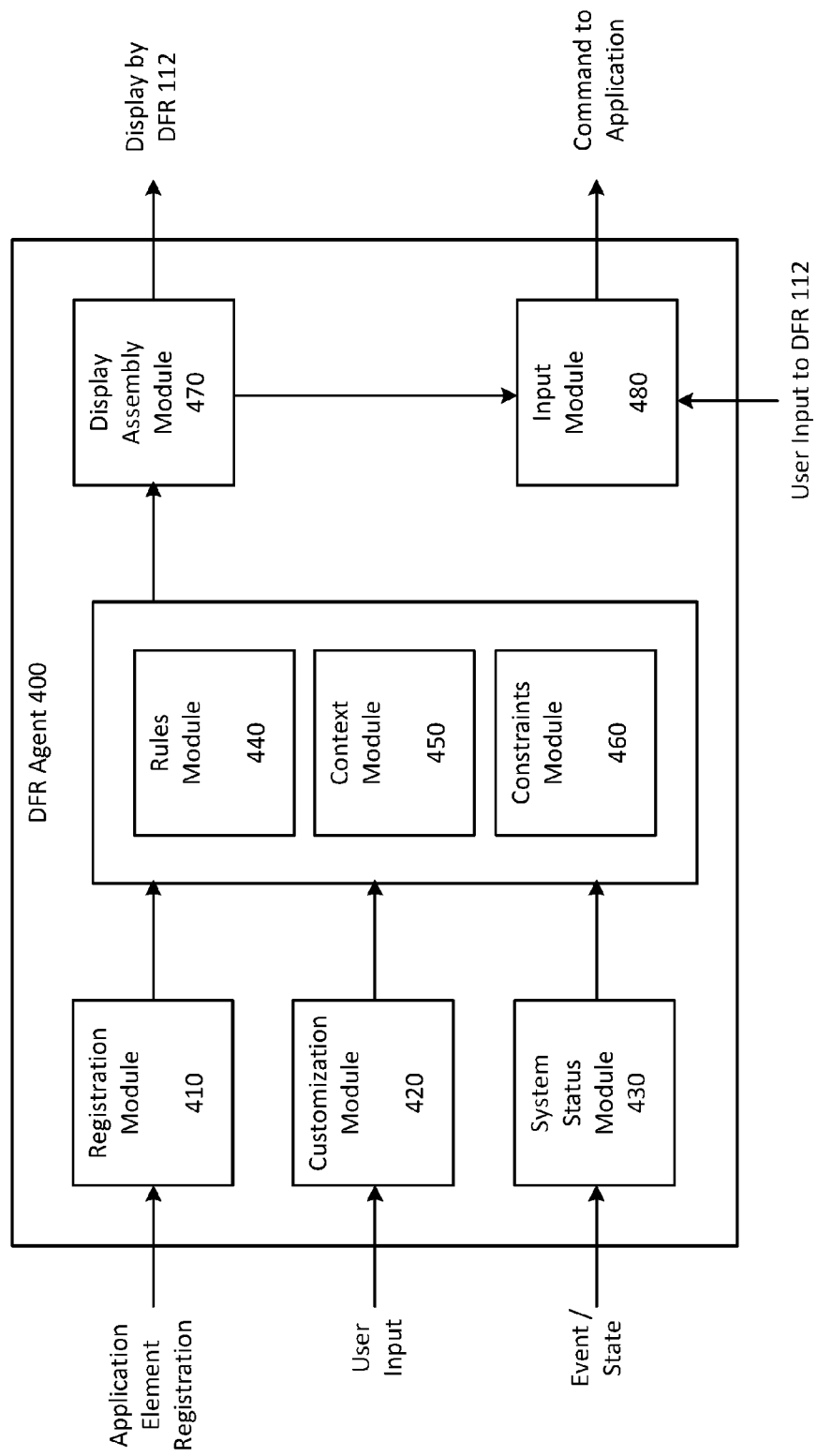

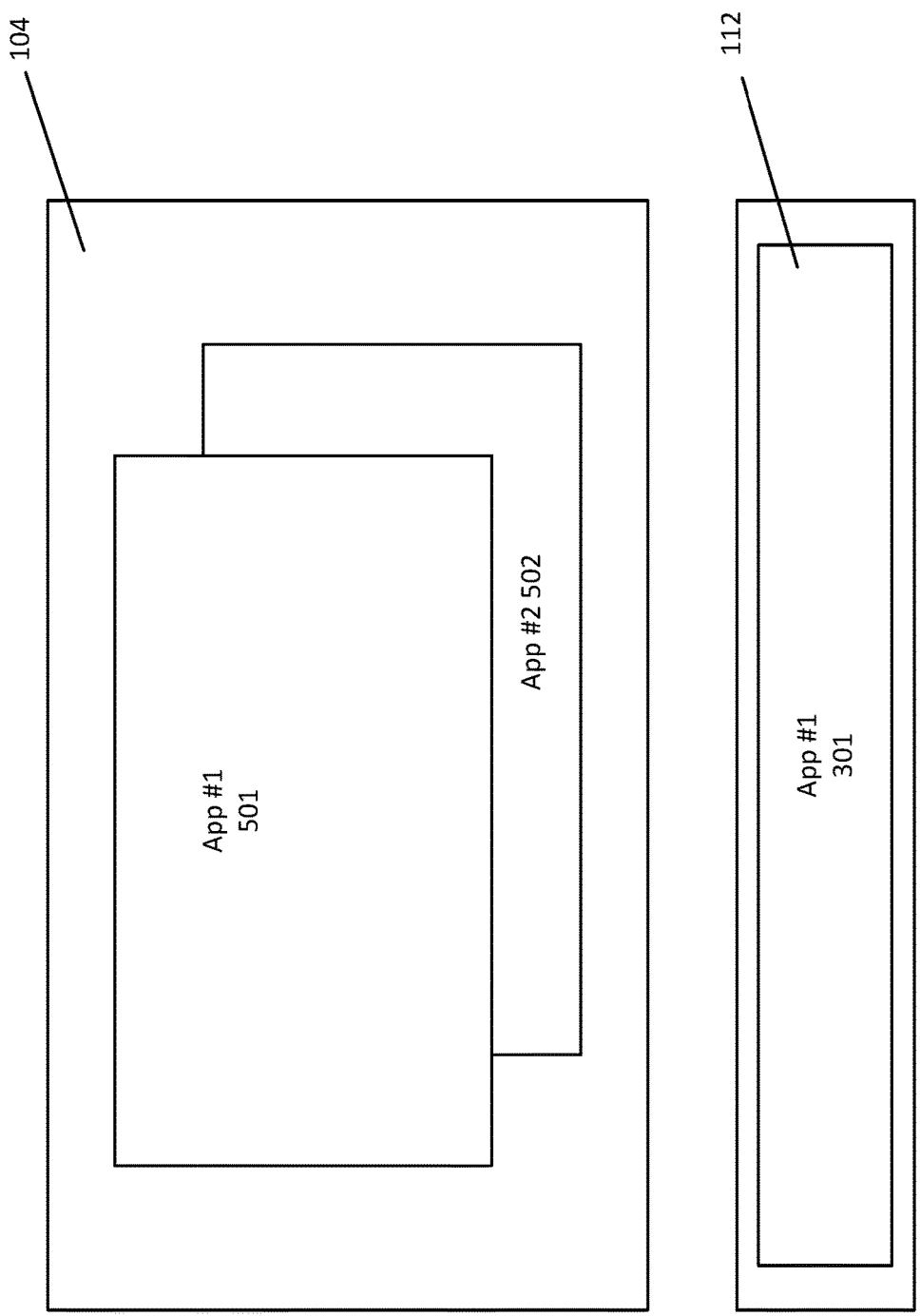

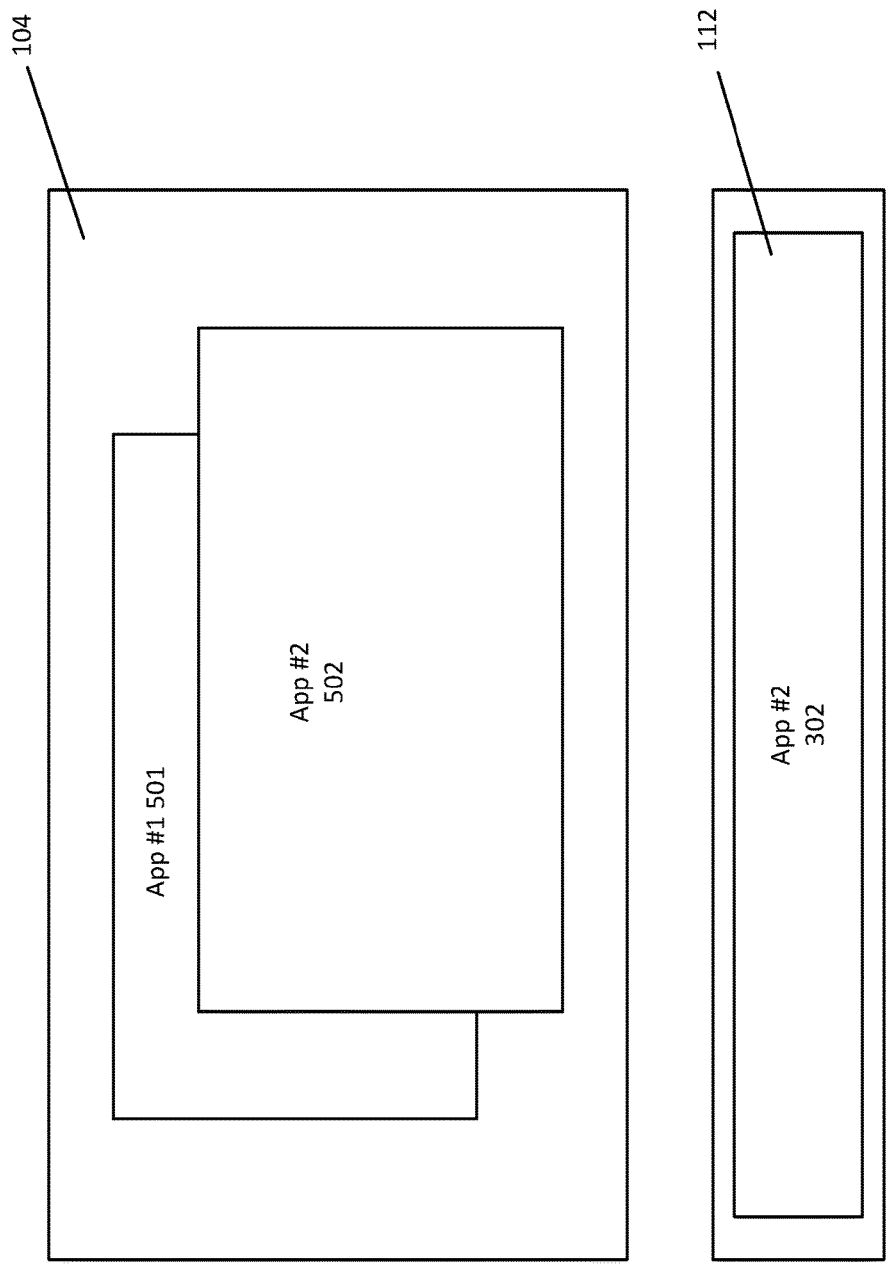

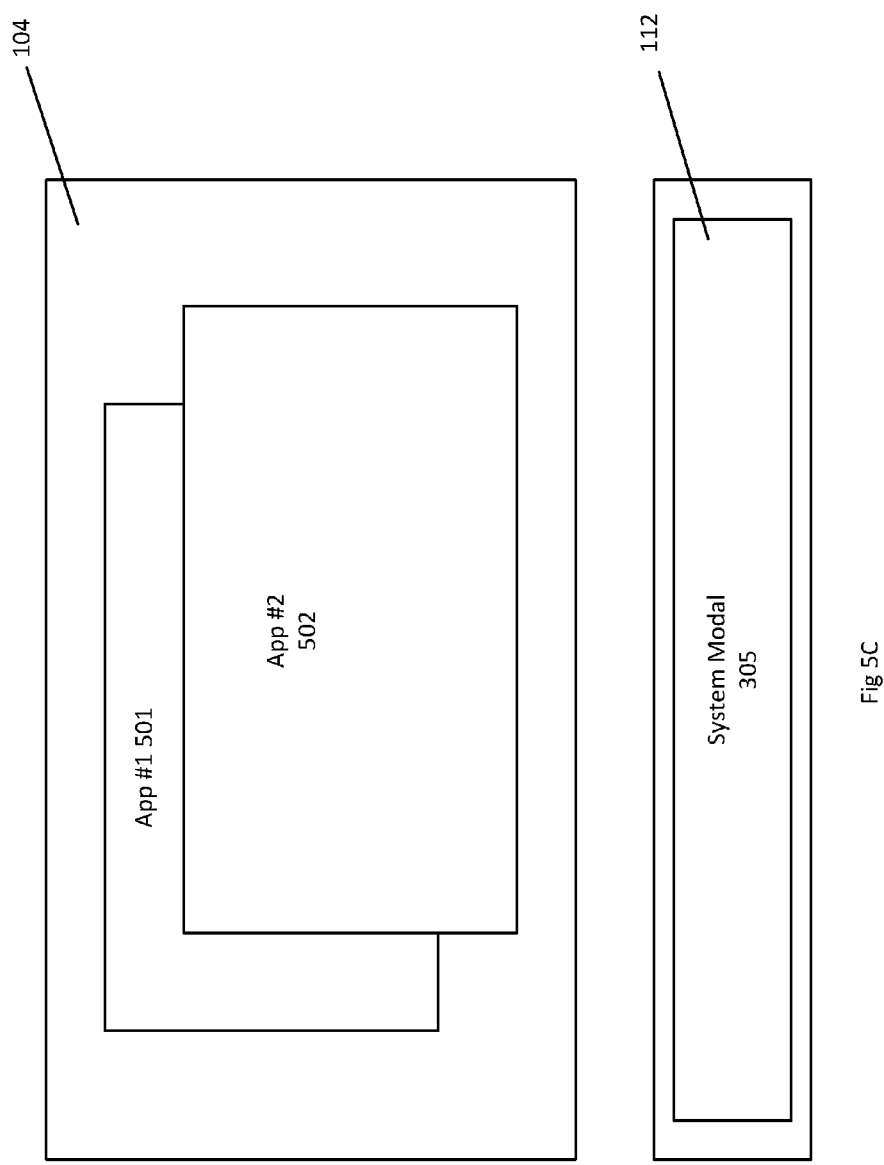

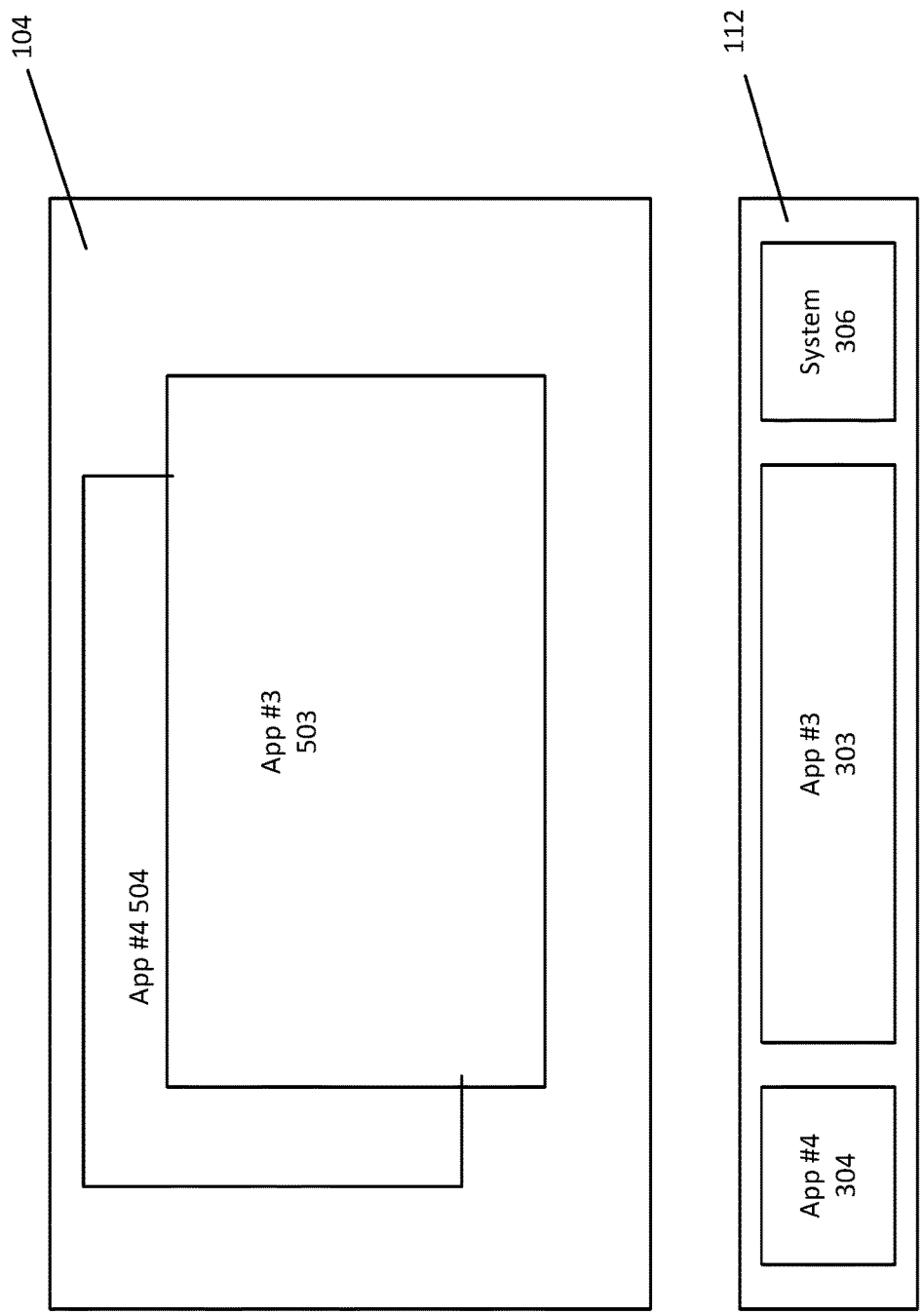

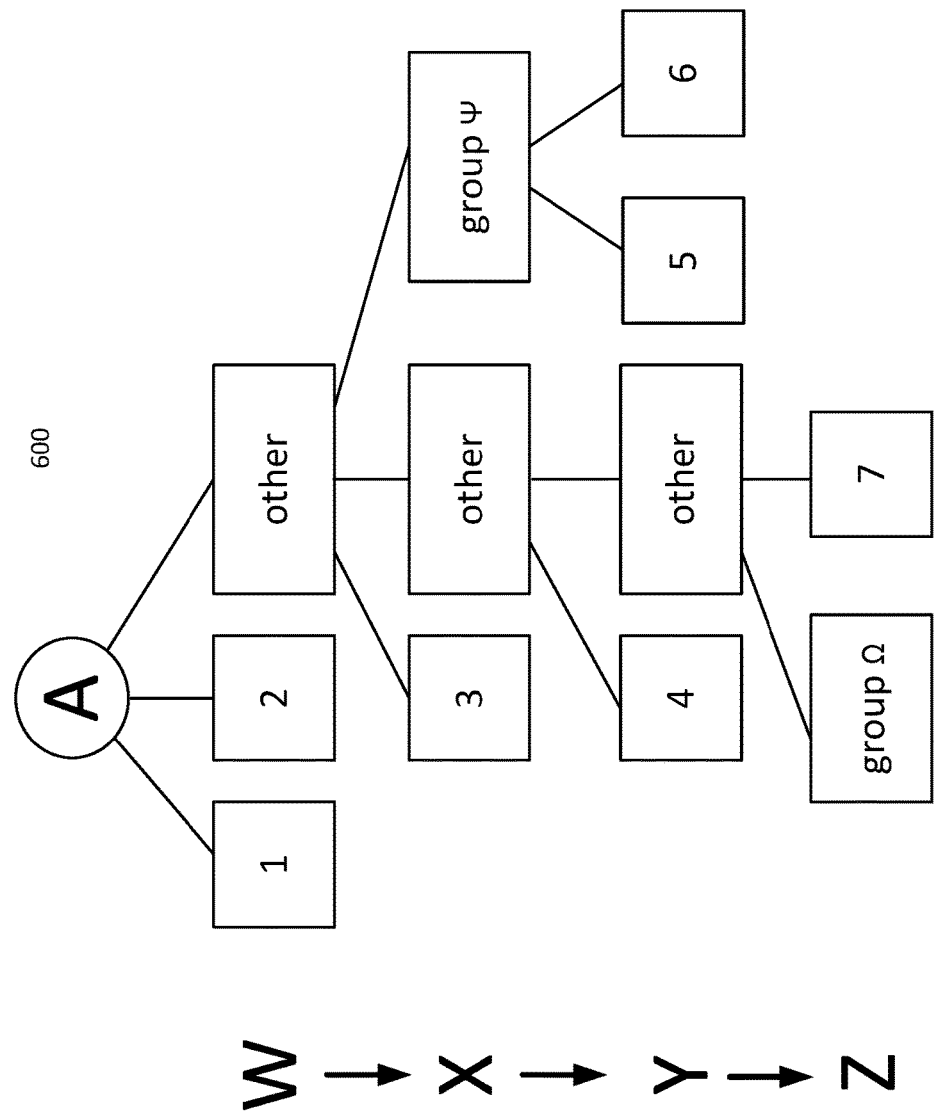

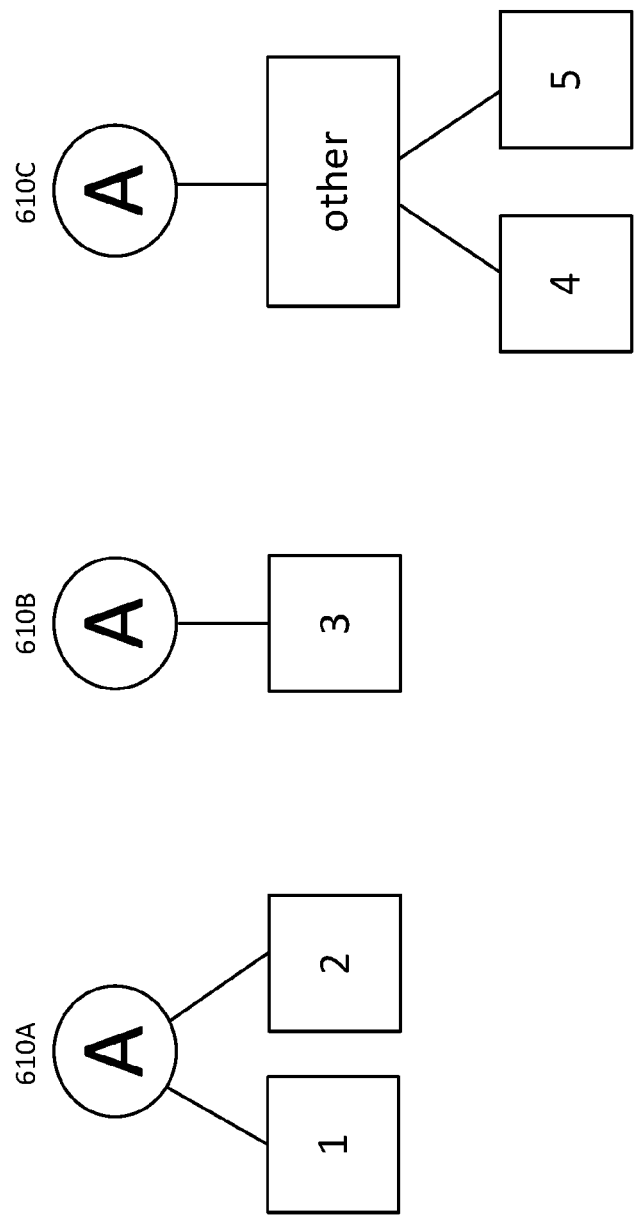

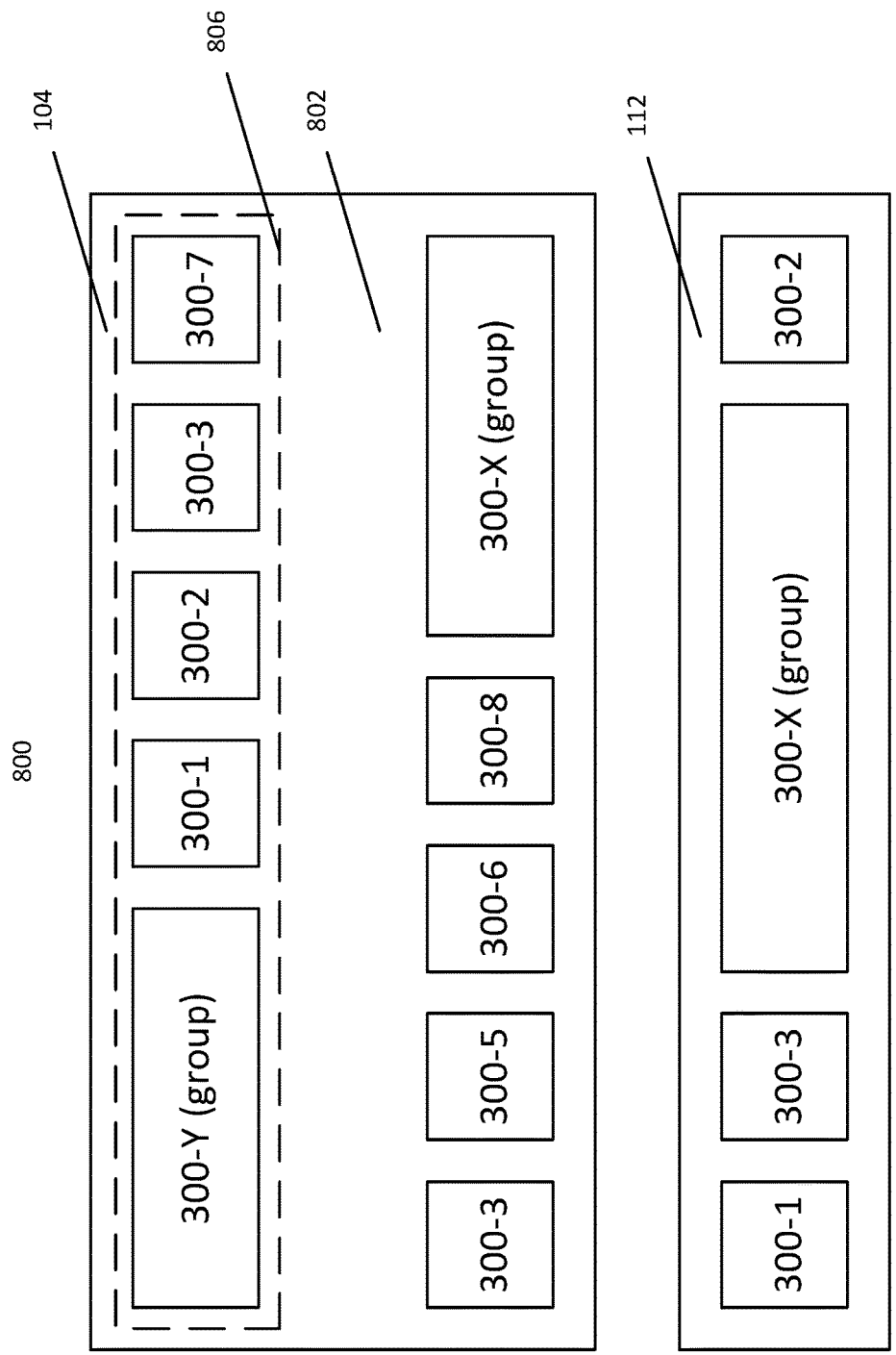

DYNAMIC FUNCTION ROW MANAGEMENT

CROSS-REFERENCE TO RELATED APPLICATIONS

This application claims priority to U.S. Provisional Application Ser. No. 62/399,007, filed Sep. 23, 2016 the content of which is incorporated herein by reference in its entirety.

TECHNICAL FIELD

The disclosure generally relates to managing display data and commands for a dynamic function row.

BACKGROUND

Many computing devices, such as desktop and laptop computers, include keyboards. Many keyboards include function keys (e.g., F1-F12), which may be arranged within a single row of keys on the keyboard. Some keyboards include an escape key and/or other keys (print screen, scroll lock, pause, etc.) in the same row. This row of keys may be referred to as a "function row."

SUMMARY

In some implementations, a computing device can include a dynamic function row (DFR) for providing a user access to context specific functions of the computing device. For example, a DFR, or "touch bar," may be a combined display and input device (e.g., a touchscreen) that can display a dynamically generated graphical user interface (GUI) that presents graphical elements representing context specific functions. The DFR can receive user input selecting displayed graphical elements and invoke the corresponding functions on the computing device. The DFR may provide different interface elements in different situations. For example, the DFR may provide controls relevant to an application or applications the user is currently using or may provide specific controls in response to detected events (e.g., an incoming message received or a user command to display function row keys, etc.). Systems and methods described herein may enable and manage these and other DFR features.

Particular implementations provide at least the following advantages. The DFR can provide GUI functions that are relevant to the user's context or use of the computing device. The DFR can be dynamically updated based on device context, for example based on what applications are in use or whether any notifications are active. Users and applications may be able to customize GUIs provided by the DFR. The GUI may provide visual cues for functions to be invoked through the DFR, as opposed to traditional function keys (e.g., F1 could have different functions for different applications, but the user does not know what the function is by looking at the key itself). A DFR agent that manages the DFR can automatically select, arrange, and change GUI elements. The DFR agent may generate the GUI and process the inputs so that individual applications need not directly interact with the DFR.

Details of one or more implementations are set forth in the accompanying drawings and the description below. Other features, aspects, and potential advantages will be apparent from the description and drawings, and from the claims.

DESCRIPTION OF DRAWINGS

FIG. 4 is a block diagram of an example DFR agent.

FIG. 5A is an example main display and DFR wherein data related to the same app is shown on both displays.

FIG. 5B is an example main display and DFR wherein data related to the same app is shown on both displays.

FIG. 5C is an example main display and DFR wherein system priority data is shown on the DFR.

FIG. 5D is an example main display and DFR wherein elements from multiple sources are shown on the DFR.

FIGS. 6A-6C show example item trees.

FIG. 8 shows an example DFR layout editor interface.

Like reference symbols in the various drawings indicate like elements.

DETAILED DESCRIPTION

DFR-Equipped Devices

In some implementations, a computing device can include a dynamic function row (DFR). For example, a DFR can be a touch sensitive display device that may, among other things, provide the functionality of a traditional keyboard function row. A computing device comprising a DFR may include hardware, software, and/or firmware configured to manage information displayed by the DFR and/or user inputs received by the DFR. For example, the device may instantiate a DFR agent, which may manage the DFR. The DFR agent may generate images to display on the DFR based on a current state of the device. The DFR agent may generate images comprising elements for display on the DFR that have been registered by one or more device applications. The DFR agent may select registered elements for display based on a priority of applications defined by a responder chain order, based on a set of constraints defining how, where, and/or when elements may be displayed, based on user customizations, and/or other factors. The DFR may display the image. Additionally, a user may touch the DFR to provide input selecting functions and/or commands represented by graphical elements presented on the DFR display. The DFR agent may parse the commands and send them to the appropriate application.

Figure 1:
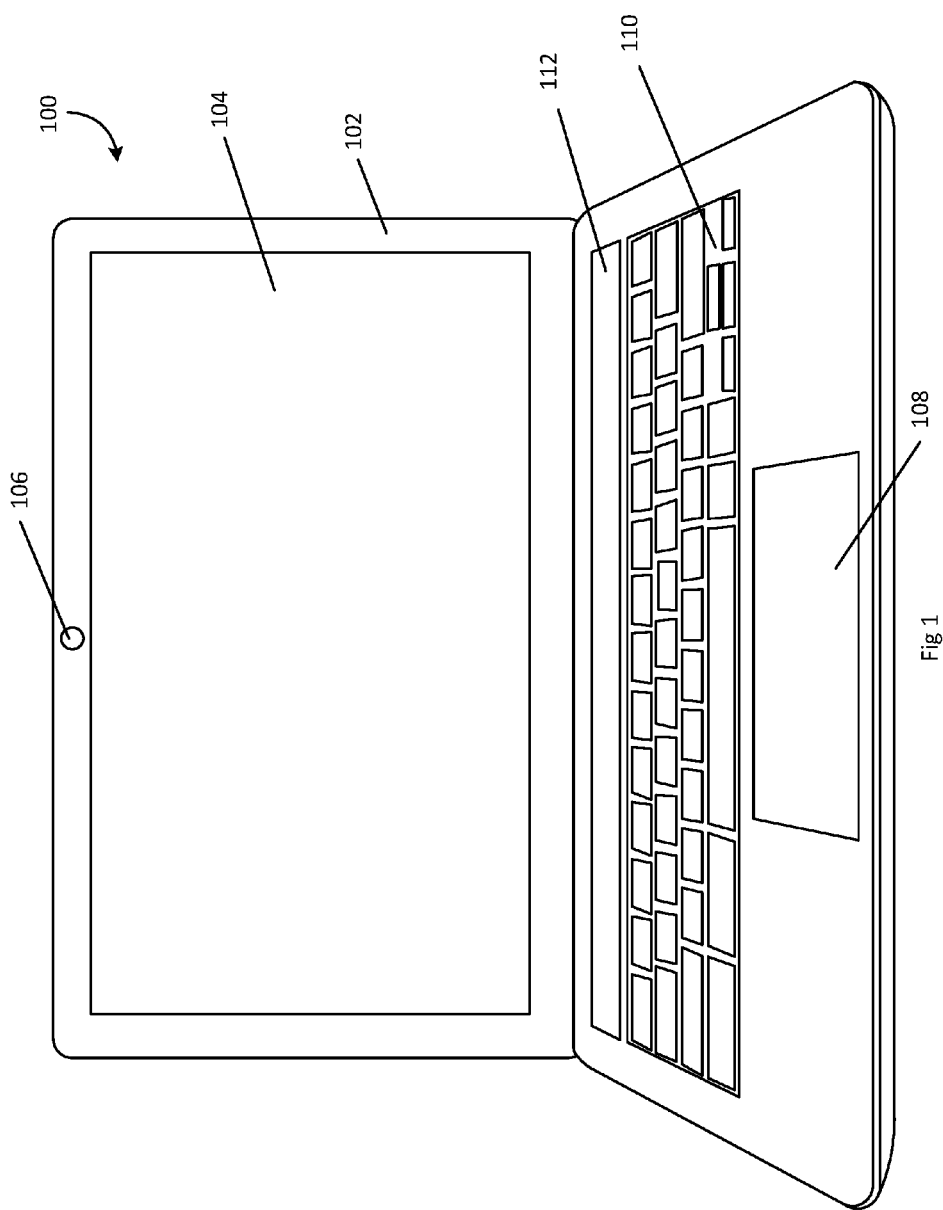
FIG. 1 is an example device with a DFR.

FIG. 1 is an example device 100. Representative device 100 is shown as a laptop computer, but device 100 may be one of a variety of electronic devices including, but not limited to, laptop computers, desktop computers, computer terminals, television systems, tablet computers, e-book readers, smart phones, smart watches, and wearable computers, for example. Device 100 may include case 102, main display 104, camera 106, touchpad 108, keyboard 110, and/or DFR 112. DFR 112 can include a touch sensitive display, display controller, touch input controller, and/or other hardware configured to provide the GUI and input features discussed herein. In example device 100, DFR 112 is provided instead of a traditional function row comprising physical keys and is positioned where a function row might typically be found on a standard keyboard layout. For example, some keyboards have a row of physical keys including an escape key, function keys F1-F12, and/or additional keys, above physical number and letter keys. In some embodiments, DFR 112 may be located above physical number and letter keys in place of the physical key row including the escape key and keys F1-F12. In other embodiments, DFR 112 may be provided in addition to a function row comprising physical keys, may be located elsewhere on device 100, and/or may have different configurations and/or orientations from a row. For example, the DFR 112 can have a shape similar to a number-pad shaped rectangle or a vertical column. In addition, the DFR 112 can be composed of multiple displays that are physically separated (e.g., a DFR 112 comprising two distinct display areas that are physically separated).

Figure 2:
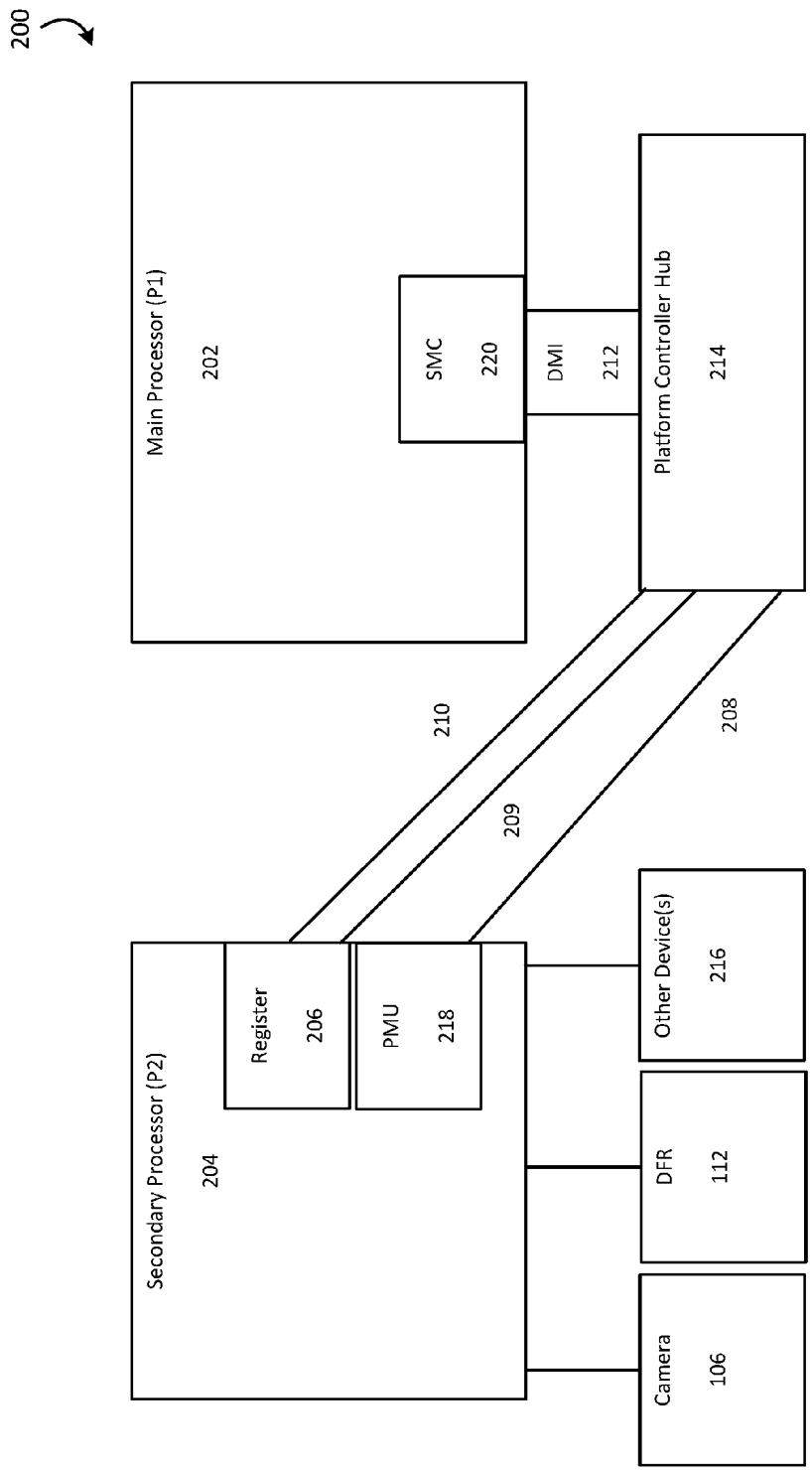
FIG. 2 is a block diagram of example DFR control hardware.

FIG. 2 is a block diagram of example DFR control hardware 200 of device 100. Device 100 may include main processor 202 (e.g., an X86 processor or other suitable processor). For example, main processor 202 may be an application processor that is configured to run the primary operating system of device 100 and/or any system or user applications executed on device 100. Main processor 202 may be coupled to platform controller hub 214 through bus 212 (e.g., front-side bus, hyper transport, quick path interconnect, direct media interface, or other bus) and, through platform controller hub 214, to other components of device 100 (e.g., video card, audio card, network card, memory, hard drive, input device(s), etc.). Main processor 202 may control general device 100 functionality, for example running an operating system (e.g., iOS, Windows, Linux, etc.) and applications. Main processor 202 may include system management control (SMC) 220 firmware configured to manage thermal regulation, power use, battery charging, video mode switching, sleep, standby, and other functions. SMC 220 may be active at all times while device 100 is powered on so that it can wake main processor 202 from sleep or standby modes, for example.

In some implementations, device 100 may include secondary processor 204. For example, secondary processor 204 can be a system on chip SoC, a coprocessor, an ARM processor, or the like. Secondary processor 204 may run an operating system different from the operating system operating on the main processor 202. For example, the secondary processor 204 may run an operating system such as iOS, watchOS, a real time operating system, an operating system for embedded systems, or a Linux variant. Secondary processor 204 may operate camera 106, DFR 112, and/or other device(s) 216 (e.g., touch identification sensor, ambient light sensor, etc.). Secondary processor 204 may include power management unit (PMU) 218 firmware configured to manage thermal regulation, power use, hardware power functions, sleep, standby, and other functions. PMU 218 may be active at all times while device 100 is powered on so that it can restore secondary processor 204 to a fully operational mode and/or allow secondary processor 204 to communicate with main processor 202 while main processor 202 is in a low power state, for example.

In some implementations, main processor 202 and secondary processor 204 may communicate with one another through link 210. For example, link 210 can be a USB2 link or similar data link. For example, main processor 202 may generate images for display on DFR 112 and communicate them to secondary processor 204 over link 210, allowing secondary processor 204 to display the images on DFR 112. In some implementations, secondary processor 204 may receive touch inputs made to DFR 112 and communicate touch input data to main processor 202 over link 210, allowing main processor 202 to process the inputs.

In some implementations, main processor 202 and secondary processor 204 may communicate with one another through inter-integrated circuit ($I^2C$) bus 209. Main processor 202 may use $I^2C$ bus 209 to place data in a memory register 206 ("mailbox") of secondary processor 204. Mailbox register 206 may serve as a PMU scratchpad where commands for PMU 218 are written by main processor 202. For example, main processor 202 may place data in memory register 206 to communicate with secondary processor 204 when link 210 is inactive.

In some implementations, main processor 202 and secondary processor 204 may be coupled to one another through general purpose input/output (GPIO) paths 208. Each GPIO path 208 may comprise a GPIO pin at main processor 202 and a GPIO pin at secondary processor 204 which may be coupled to one another. Each processor may be configured to set its respective GPIO pins as inputs or outputs. When a processor's pin is set as an output, the processor may drive the pin low (logic 0 or low voltage) or high (logic 1 or high voltage) and thereby send a data bit to the other processor. When a processor's pin is set as an input, the processor may detect when the voltage on the pin changes and perform processing in response. For example, main processor 202 may use GPIO paths 208 to trigger actions by secondary processor 204, such as triggering interrupts causing secondary processor 204 to read data in mailbox register 206. Secondary processor 204 may use GPIO paths 208 to send acknowledgements to main processor 202.

Figure 3:
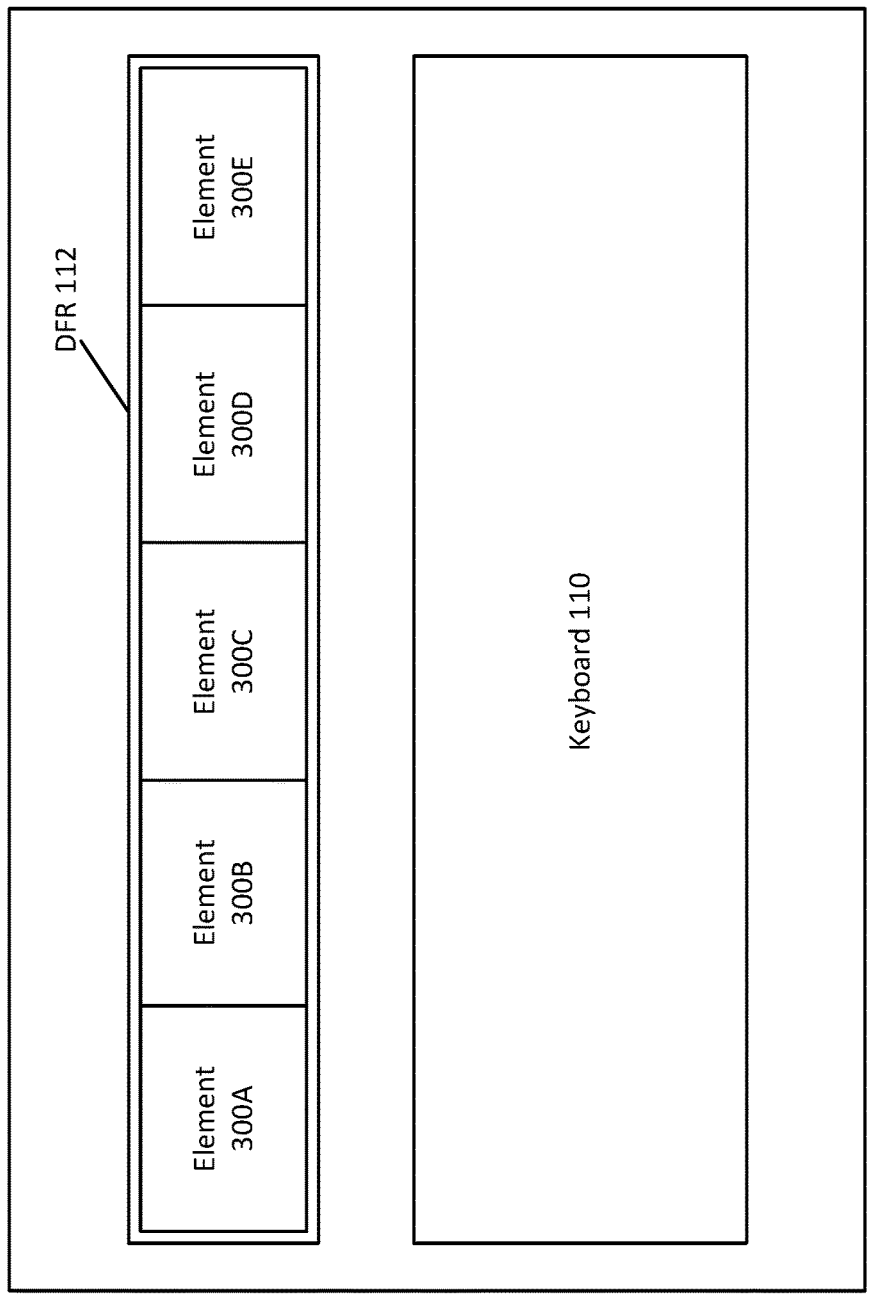
FIG. 3 is an example DFR and keyboard layout.

FIG. 3 is an example DFR 112 and keyboard 110 layout for a device 100 such as a laptop computer. DFR 112 may be disposed above keyboard 110 in a location where a function row may otherwise be expected. While FIG. 3 provides an example layout for a laptop computer, in some embodiments, device 100 may be a desktop computer, and DFR 112 may be disposed on a keyboard peripheral of device 100, on a separate dedicated I/O peripheral, on a body of the desktop computer, etc.

In some implementations, DFR 112 may present one or more DFR graphical elements 300 (in this example, five DFR graphical elements 300A-300E, although any number of DFR UI elements 300 may be possible). DFR UI elements 300 may comprise text, symbols, images, and/or other visual information. The visual information may be dynamically generated by processor 202 as described below or selected from among pre-generated visual information. DFR UI elements 300A-E may represent functions provided by computing device 100 or any of the various applications running on computing device 100. For example, DFR UI elements 300A-E can provide a virtual representation of traditional function "keys" presented in discrete touch UI areas, such that the separate elements 300A-E correspond to separate commands. For example, element 300D may be UI element to lower the audio volume, and element 300E may be UI element to raise the audio volume. DFR UI elements 300D and 300E may display symbols or images corresponding to the audio volume commands. A user's touch input on (e.g., selection of) DFR UI element 300D may register a command to lower the audio output volume of device 100, and a touch input on element 300E may register a command to raise the audio output volume of device 100, as described below.

DFR 112 may display a variety of DFR UI elements 300 corresponding to a variety of function controls. Some DFR UI elements 300 may provide system-level functionality and/or may be applicable to a variety of applications. Such DFR UI elements 300 may include controls for volume, muting the speakers, screen brightness, playback, enabling/disabling a wireless network receiver, multi-screen, help function, system search, recent and/or frequently used application launch, message access, document access, file system access, calendar, and/or others.

In some implementations, DFR UI elements 300 may provide functionality tailored to specific applications. For example, the functionality can be tailored or dynamically generated based on an application context. The functionality can be tailored or dynamically generated based on a plurality of applications having similar functionalities. The functionality can be tailored or dynamically generated based on specific features within applications. Such DFR UI elements 300 may include controls for font choice, font size, font color, font effect, highlighting, list functions, text autocomplete suggestions, special characters, cut, copy, paste, and/or others for applications or features related to text editing; address bar, reload, bookmark, forward, backward, new tab, history, download, and/or others for applications or features related to web browsing; brush size, brush shape, color, shape effects, text box editing, cropping, rotating, filters, cut, copy, paste, and/or others for applications or features related to graphics editing, and many others. This listing of controls is not meant to be exhaustive, but only to illustrate possible DFR UI element 300 feat and functions in some embodiments.

In some cases, active DFR UI elements 300A-E may be separated from one another by a blank space. For example, DFR UI elements 300A and 300C may be active elements displaying images and accepting inputs, while DFR UI element 300B may be a blank space that displays no image and accepts no input. In some implementations, DFR UI element 300B can be an image meant to separate DFR UI elements 300A and 300C. For example, DFR UI element 300B can be a vertical bar or line that separates DFR UI elements 300A and 300C.

DFR Agent

FIG. 4 is a block diagram of an example DFR agent 400. In some implementations, computing device 100 can include DFR agent 400. In some implementations, DFR agent 400 may be a single hardware, software, or firmware element. In other implementations, DFR agent 400 may comprise multiple hardware, software, or firmware elements performing the DFR agent 400 functions described below. DFR agent 400 may manage the images displayed on DFR 112 and send commands received through DFR 112 to the application for which they are intended based on which image is selected by a user. For example, DFR agent 400 may communicate with device 100 applications to receive information to display and generate GUIs for DFR 112 including the information. When a user enters a command by touching DFR 112, DFR agent 400 may determine which DFR UI element 300 was pressed and send a command associated with the pressed DFR UI element 300 to the application that registered DFR UI element 300

In some implementations, DFR agent 400 can include registration module 410. For example, registration module 410 can receive and process registrations of DFR UI element 300 from applications. As described in further detail below, registration module 410 may receive DFR UI element data from one or more applications. The DFR UI element data may include images and/or text to be displayed by DFR UI element 300. For example, the images and/or text can be presented by DFR UI element 300 and can indicate to the user which function will be performed when DFR UI element 300 is selected by the user.

In some implementations, DFR agent 400 can include customization module 420. For example, customization module 420 can receive and process user customizations to DFR UI elements 300 and/or combinations of DFR UI elements 300 displayed on DFR 112. For example, as described in further detail below, customization module 420 may provide a user interface for selecting DFR UI elements 300 and dragging them into DFR 112 itself or a simulated DFR display. A user can choose DFR UI elements 300 to be displayed for various events and/or statuses, so that when system 100 experiences a given event or enters a given status, DFR agent 400 may display DFR UI elements 300 chosen by the user for that event or status.

In some implementations, DFR agent 400 can include system status module 430. For example, system status module 430 can identify system 100 events and/or determine system 100 status for use in selecting DFR UI elements 300 for display. For example, as described in further detail below, system status module 430 may monitor system 100 state, detecting when an event takes place, such as an incoming call, and/or when a system state changes, such as when a user starts working in a different application or a different portion of an application. DFR agent 400 may use system 100 status as determined by system status module 430 to select DFR UI elements 300 corresponding to the status for display.

In some implementations, DFR agent 400 can include rules module 440. For example, rules module 440 may use one or more rules to select what should be displayed from among DFR UI elements 300 that have been registered. The rules may be configured to allow DFR agent 400 to find DFR UI elements 300 that fit a device 100 context at the time. Further discussions of the rules module 440 and example functions thereof are provided in the "Element Selection" and "Responder Chains" sections below.

In some implementations, DFR agent 400 can include context module 450. For example, context module 450 may select DFR UI elements 300 relevant to a given context based on descriptions of DFR UI elements 300 submitted in DFR UI element 300 registration. For example, in a context-driven selection, DFR UI elements 300 may be associated with specific contexts rather than responders (i.e., applications within the ordered hierarchy of a responder chain), and context module 450 may select DFR UI elements 300 based on device 100 context. For example, a user interacting with a text dialog box may be a context, an application state may be a context, an internal device state may be a context, an incoming message or other event may be a context, etc. DFR agent 400 may select DFR UI elements 300 relevant to a given context based on descriptions of elements 300 submitted in DFR UI element 300 registration.

In some implementations, DFR agent 400 can include constraint module 460. For example, constraint module 460 may select an unordered set of DFR UI elements 300 and apply a set of constraints to DFR UI elements 300 and ordered groups of DFR UI elements 300. By applying the constraints, constraint module 460 may select which DFR UI elements 300 are to be displayed in which arrangement. Constraints may establish which DFR UI elements 300 are visible and how the visible DFR UI elements 300 are arranged on DFR 112. For example, constraints may define relationships such as "these three DFR UI elements 300 must appear in a certain order left to right, or right to left" or "these three DFR UI elements 300 must appear with at least a specified amount of space between them" or "this DFR UI element 300 must appear on left" or "this DFR UI element 300 must appear on right," etc. Constraints may define an amount of fixed space or flexible (e.g., resizable) space between DFR UI elements 300.

In some implementations, DFR agent 400 may include display assembly module 470. For example, display assembly module 470 can generate display data incorporating the selected DFR UI elements 300 for presentation by DFR 112. Once rules module 440, context module 450, and/or constraint module 460 have selected and arranged DFR UI elements 300 for display, display assembly module 470 may generate the data to be displayed, for example by generating a bitmap or other image including each DFR UI element 300 arranged in the prescribed order. Display assembly module 470 may send the generated image to DFR 112 for display.

In some implementations, DFR agent 400 may include input module 480. Input module 480 can receive user inputs to DFR 112 and use data about the arrangement of DFR UI elements 300 displayed on DFR 112 to determine a command selected by the user. For example, the data may include data from display assembly module 470 defining how the selected DFR UI elements 300 are arranged on DFR 112. The data may include data from DFR 112 defining where the user pressed DFR 112. Input module 480 may receive the data about the arrangement of elements 300 from display assembly module 470, so input module 480 may determine which elements 300 are being displayed and where they are presented on DFR 112. Input module 480 may receive data describing where a user has touched DFR 112 from DFR 112. Input module 480 may correlate the data from display assembly module 470 and DFR 112 to determine which element 300 has been selected. Input module 480 may inform the application associated with the selected element 300. For example, DFR agent 400 can invoke an application API corresponding to the command or function represented by the selected element.

DFR agent 400 may function as an intermediary between applications and DFR 112. For example, applications submit data for display on DFR 112 to registration module 410. Display assembly module 470 generates an image for display and sends the image to DFR 112. Thus, applications may not directly display data on DFR 112. Input module 480 receives inputs made to DFR 112 and sends command data to applications. Thus, applications may not directly receive inputs made to DFR 112.

Element Registration

In some implementations, DFR agent 400 may accept registrations from one or more applications each registering one or more DFR UI elements 300. Each DFR UI element 300 may comprise a graphical element that is to be displayed as a section of DFR 112. A section may be as much as 100% of the total DFR 112 display area, but many DFR UI elements 300 may be smaller. Each DFR UI element 300 may have its own graphics, text, and/or functionality. Some applications may register a single DFR UI element 300, while other applications may register multiple DFR UI elements 300. In some implementations, DFR agent 400 may define a total size of DFR 112 and/or one or more acceptable DFR UI element 300 sizes that are less than the total size of DFR 112.

To register a DFR UI element 300, an application may render element content into a bitmap (or other image of a different type) that is the right size as defined by DFR agent 400. For example, DFR agent 400 may define a size for a DFR UI element 300 that spans the entire display area of DFR 112. DFR agent 400 may define a size for a DFR UI element 300 that covers a portion of the display area of DFR 112 (e.g., 10%, or 100 pixels). In some implementations, DFR agent 400 can assemble the DFR UI elements 300 into a composite image for display by the DFR 112. For example, an application or multiple applications can register DFR UI elements 300A-300E of FIG. 3. DFR agent 400 can assemble the DFR UI elements 300 into a single composite image for presentation on the display of DFR 112, rather than presenting five separate images.

In some implementations, registration data for a DFR UI element 300 submitted by an application may include image data defining an image to be incorporated into a DFR 112 bitmap and/or metadata describing the function of the DFR UI element 300. Registration module 410 may receive submitted registration data and register the DFR UI element 300. Registration module 410 may store the registered DFR UI element 300 in device 100 memory for future use in building displays for DFR 112 as described below.

The image data may include a bitmap or other image file. In some embodiments, instead of receiving a bitmap or other image file from an application, registration module 410 may perform a language based image rendering. In this approach, registration module 410 may create or select the image for display based on parameters provided by the application. For example, the application may provide information indicating that it is registering an element 300 with a specified title, function, and size. Registration module 410 may build the element 300 according to the specified parameters. In some implementations, registration module 410 may build the element 300 by selecting an image from a library of images available to registration module 410. The library may include images identified according to the commands they represent. For example, one image may be tagged as a "pause media playback" image, another image may be tagged as an "increase font size" image, and another image may be tagged as an "accept incoming message" image. If an application specifies the function of a DFR UI element 300 as "pause media playback," registration module 410 may select the image tagged as a "pause media playback" image.

In some implementations, DFR agent 400 can receive metadata for DFR UI element 300. The metadata can include information defining a command associated with DFR UI element 300. For example, the DFR UI element data can identify an application programming interface (API) that DFR agent 400 should invoke when DFR UI element 300 is selected by the user. The DFR UI element data can include information (e.g. an application identifier) linking DFR UI element 300 to the application. Registration module 410 may register the received DFR UI element data so that other DFR UI elements 300 can use the registered data to select DFR UI elements 300 for display and process commands associated with DFR UI elements 300 being displayed.

DFR agent 400 may specify a standardized format or language for metadata submissions. For example, a metadata submission may include an application identifier, a function identifier (e.g., an API identifier), and, in some cases, display parameters. The application identifier may tell DFR agent 400 which application is associated with the DFR UI element 300. The function identifier may tell DFR agent 400 what application command or API is associated with the DFR UI element 300. The display parameters may include rules and/or constraints for displaying the DFR UI element 300, as described in greater detail below. For example, registration metadata for a media playback control DFR UI element 300 may include the following information: "application—media player; function—pause; parameter—left edge>left edge of stop element." In this example, the application identifier may tell DFR agent 400 that when a user selects the DFR UI element 300, the command is intended for the media player application. The function identifier may tell DFR agent 400 that when a user selects the DFR UI element 300, the command is a pause media playback command. The display parameter may tell DFR agent 400 where the DFR UI element 300 should be placed on DFR 112 relative to other DFR UI elements 300, as described in greater detail below.

DFR agent 400 may use the metadata to translate a user selection of a DFR UI element 300 into a command processed by an application. For example, when an application registers DFR UI element 300, DFR agent 400 can receive metadata for DFR UI element 300 that defines the purpose of DFR UI element 300. The metadata may allow DFR agent 400 to associate user selection of DFR UI element 300 with a corresponding application command, as described below. For example, an application may register an DFR UI element 300 including a bitmap showing an underlined letter and metadata defining the DFR UI element 300 as a control for underlining text. User selection of this DFR UI element 300 may toggle text underlining in the application that registered the DFR UI element 300. For example, in response to receiving the user selection of the underline DFR UI element 300, DFR agent 400 may invoke a corresponding API, which may cause the application to underline some selected portion of text.

In some implementations, an application may register a single DFR UI element 300 comprising a plurality of controls for the application. For example, registration metadata for a DFR UI element 300 may specify a plurality of distinct areas within the DFR UI element 300, wherein user interactions with each different area produce different results. For example, a media playback control DFR UI element 300 may include the following information: "application—media player; left 50% function—pause; right 50% function—stop." In this example, the application identifier may tell DFR agent 400 that when a user selects the DFR UI element 300, the command is intended for the media player application. The function identifiers may tell DFR agent 400 that when a user selects the left half of the DFR UI element 300, the command is a pause media playback command, and when a user selects the right half of the DFR UI element 300, the command is a stop media playback command.

In some implementations, the application may register one or more discrete DFR UI elements 300 each comprising a single control or a few controls for the application. In some embodiments, separate applications may register DFR UI elements 300 having the same or similar functionality (in some cases, identical DFR UI elements 300 having the same graphics and functionality). Applications may express DFR UI element 300 functionality during registration so DFR agent 400 can determine the commonality. This may be useful, for example, if app A and app B both have the same control registered. For example, first DFR UI element metadata may include "application—app A; function—choose font; parameter—none" and second DFR UI element metadata may include "application—app B; function—choose font; parameter—none." DFR agent 400 may preserve continuity for common DFR UI elements 300 when switching from displaying DFR UI elements 300 relevant to the different applications. For example, a font choice DFR UI element 300 may be displayed at the same place on DFR 112 when DFR agent 400 switches from showing app A DFR UI elements 300 to app B DFR UI elements 300. This may also be useful when different functional levels of a single application have registered the same or similar DFR UI elements 300. An application may have several functional levels (e.g., subsections), each having its own functionality, as described in greater detail below.

In some implementations, DFR UI element 300 can include a group of elements. For example, a group element may comprise multiple elements (forming a conceptual grouping of things that are not to be separated. For example, a group element may include a plurality of media control DFR UI elements 300 (e.g., playback controls) that should not be separated. The group element registration data may specify which DFR UI elements 300 appear in the group and may define a specific order for the DFR UI elements 300. Thus, when a group element is displayed on DFR 112, all DFR UI elements 300 within the group may appear in the same fixed order every time.

A DFR UI element 300 may be regarded as being similar to a window or dialog but fully managed by DFR agent 400. In other words, DFR agent 400 may be regarded as providing a windowing system wherein the user of device 100 has only indirect control over size or position of the windows. The user's actions may affect which DFR UI elements 300 are displayed (e.g., the user opens an application and DFR agent 400 displays elements 300 registered by that application, or the user selects DFR UI elements 300 they would like to see displayed in a given device 100 state). However, DFR agent 400 performs actual selection and arrangement of the DFR UI elements 300, in contrast to a user dragging and/or resizing a window in a windowed GUI. DFR agent 400 may provide centrally coordinated animation for changes within DFR UI elements 300 and/or transitions between DFR UI elements 300 being displayed.

Additionally, because the application only registers DFR UI elements 300, and DFR agent 400 selects DFR UI elements 300 for display, the application may not have access to DFR 112 hardware. Indeed, the application may not be able to determine whether its DFR UI element 300 is displayed on DFR 112 or being run virtually on main display 104 (e.g., for debugging or user customization). Running a DFR UI element 300 virtually in a manner that is invisible to the application may allow for accurate simulation and/or debugging, because the application will not behave differently due to being placed in a simulation or debug mode.

Element Selection

In some implementations, DFR agent 400 can select registered DFR UI elements 300 to present on the display of DFR 112. For example, registered DFR UI elements 300 are not necessarily shown on DFR 112. System status module 430 may detect system 100 events (e.g., incoming calls or messages, user commands to display specific DFR UI elements 300, alerts, etc.) and/or system 100 states (e.g., specific application the user is interacting with, specific part of the application the user is interacting with, other applications currently running). Customization module 420 may receive user preference information describing the user's preferences regarding which DFR UI elements 300 are to be displayed in various situations. DFR agent 400 may evaluate data provided by system status module 430 and/or customization module 420 using one or more of rules module 440, context module 450, and constraint module 460 to select DFR UI elements 300 for display. Once DFR UI elements 300 have been selected for presentation on the display of DFR 112, display assembly module 470 may generate an image comprising the selected DFR UI elements 300 for presentation on DFR 112.

Rules module 440 may use one or more rules to select what should be displayed from among DFR UI elements 300 that have been registered. The rules may be configured to allow DFR agent 400 to find DFR UI elements 300 that fit a device 100 context at the time. For example, rules module 440 may prescribe a rule that when device 100 is receiving an incoming call, DFR 112 should display one or more DFR UI elements 300 for handling the call (e.g., providing controls to answer call, dismiss call, send to voicemail, provide call information, etc.). The rules may also define how selected DFR UI elements 300 are arranged and sized. For example, in the incoming call scenario, rules module 440 may prescribe a rule that the call DFR UI elements 300 should fill the entire DFR 112, or a rule that the call DFR UI elements 300 should appear on the left half of the DFR 112. Using the rules, DFR agent 400 may switch between DFR UI elements 300 based on system 100 state.

FIG. 5A is an example main display 104 and DFR 112. This example illustrates a scenario wherein data related to the same app is shown on both main display 104 and DFR 112. According to one example rule, DFR agent 400 may track which application is front most and display one or more DFR UI elements 300 registered by that application. For example, as shown in FIG. 4, app #1 window 501 is currently active on main display 104, suggesting that the user is currently engaged with app #1. Another application window may be open (e.g., app #2 window 502), but may be in the background or otherwise not currently being used by the user. Accordingly, app #1 may be regarded as a front most application, and DFR agent 400 may follow a rule indicating that the front most application has priority to select DFR UI element 301 that has been registered by app #1. DFR UI element 301 may be a discrete element providing a single function or may be a group element providing multiple functions (i.e., a single DFR UI element 301 assembled from a plurality of DFR UI elements 300 registered by app #1).

If app #1 has registered multiple elements, DFR UI element 301 may be further selected based on a specific aspect of app #1 with which the user is currently engaged. For example, if app #1 is an email application with separate registered DFR UI elements 300 relevant to a recipient dialog and a message box dialog, DFR agent 400 may display recipient dialog elements (e.g., address book element, autocomplete element, cc/bcc element, etc.) when user is typing in the recipient dialog and message box elements (e.g., font choice elements, autocomplete element, signature element, hyperlink element, object insertion element, etc.) when user is typing in the message box.

FIG. 5B is an example main display 104 and DFR 112. This example illustrates a scenario wherein data related to the same app is shown on both main display 104 and DFR 112 after a user starts working in a different app from the example of FIG. 5A. As shown, when user switches from working in app #1 to working in app #2, app #2 window 502 may become active on main display 104. Accordingly, app #2 may be regarded as a front most application, and DFR agent 400 may follow a rule indicating that the front most application has priority to select DFR UI element 302 that has been registered by app #2. DFR UI element 302 may be a discrete element providing a single function or may be a group element providing multiple functions (i.e., a single DFR UI element 302 assembled from a plurality of DFR UI elements 300 registered by app #2).

FIG. 5C is an example main display 104 and DFR 112 wherein system priority data is shown on DFR 112. According to another example rule, some DFR UI elements 300 may be system priority elements. For example, system priority elements may be registered by system priority applications and/or may be relevant to certain device 100 priority states or system modal events (e.g., wherein a user must address the event before continuing to use the application or device 100). The rule may require that, in response to system priority events, certain DFR UI elements 300 may be presented regardless of what else is happening (e.g., regardless of which window is active on main display 104). As shown in FIG. 5C, for example, system priority DFR UI element 305 is shown on DFR 112 despite app #2 window 502 being front most on display 104.

A system priority event triggering this rule may be any event specified by the rule. Some examples may include detecting an incoming message (e.g., an audio or video call or a chat message), wherein DFR agent 400 may select a system priority DFR UI element 305 including message application functionality; an active screen recording session, wherein DFR agent 400 may select a system priority DFR UI element 305 including screen recording functionality; a specific user command (e.g., a user entering a command to display a function row), wherein DFR agent 400 may select a system priority DFR UI element 305 relevant to the command (e.g., a set of function keys); receiving a notification or popup message, wherein DFR agent 400 may select a system priority DFR UI element 305 including controls for dealing with the notification or message; and/or other events. According to a related example rule, when the event ends, DFR agent 400 may revert to displaying the DFR UI element 300 that was shown before the event. In the example of FIG. 5C, this may be a reversion to the display of FIG. 5B. According to another related example rule, DFR agent 400 may revert to displaying the DFR UI element 300 that was shown before the event in response to a user command to dismiss the system priority DFR UI element 305 (e.g., an ignore message command or a hide function row command).

Rules may be predefined and/or may be set up dynamically. In some implementations, predefined rules may be rules that DFR agent 400 applies due to system 100 settings. For example, keyboard 110 may include a "display F-keys" button. DFR agent 400 may apply a predefined rule requiring display of the F-key elements 300 (e.g., elements 300 for function keys F1-F12, an escape key element 300, and/or others) on DFR 112 when the user presses (or presses and holds) the display F-keys button. Accordingly, when a user presses (or presses and holds) the display F-keys button, DFR 112 may switch from displaying images/symbols to displaying the F-key elements 300.

Dynamically established rules may be registered by applications. In another example, the rule requiring display of a messaging DFR UI element 300 in response to an incoming message may be a dynamically established rule. For example, the behavior may be defined in registration metadata by an application responsible for the messaging. The application may register a DFR UI element 300 and assert an interest in having that DFR UI element 300 be displayed by a rule under certain conditions. DFR agent 400 may evaluate this interest against other application interests to prioritize and establish overall rules which may include a hierarchy of priorities for system modal applications.

FIG. 5D is an example main display 104 and DFR 112. In this example, elements from multiple sources are shown on the DFR 112. In some cases, DFR UI element 303 registered by app #3 with front most window 503 may not fill the entire DFR 112. DFR agent 400 may select one or more additional DFR UI elements (e.g., app #4 DFR UI element 304, system DFR UI element 306) for display in these cases. DFR agent 400 may select additional application DFR UI elements (e.g., DFR UI element 304) by traversing a responder tree as described below, for example.

System DFR UI element 306 may be an element providing system-level, rather than application-level, controls. For example, system DFR UI elements 306 may provide brightness controls, window arrangement controls (e.g., app expose, view all apps, view desktop), media controls, disk eject controls, etc. In some cases, system DFR UI elements 306 may always be present or may always be present unless a system priority DFR UI element 305 has taken over the DFR 112. For example, DFR agent 400 may enforce a rule stating that system DFR UI element 306 must always appear on the right side of DFR 112. In this example, DFR agent 400 may fill the rest of DFR 112 with a front most application's DFR UI elements 300 but leave system DFR UI element 306 on the right side of DFR 112. Some examples of system DFR UI elements 306 may provide generally useful controls like brightness, volume, wireless networking toggle, and/or others.

In some embodiments, DFR agent 400 may maintain a whitelist of applications that are allowed to take over the entire DFR 112. According to an example rule, if the front most application is on the whitelist, it may have the ability to take over the entire DFR 112. For example, DFR agent 400 may have a whitelist including app #1 and app #2. Thus, as shown in FIGS. 5A and 5B, app #1 DFR UI element 301 and app #2 DFR UI element 302 may fill DFR 112. If the front most application is not on the whitelist, DFR agent 400 may select DFR UI elements registered by the application that do not fill the entire DFR 112 and may populate the rest of DFR 112 display space with other DFR UI elements 300. For example, app #3 may not be on the whitelist, so DFR agent 400 may select app #3 DFR UI element 303 and additional DFR UI elements 304 and 306 to fill DFR 112, as shown in FIG. 5C.

Responder Chains

As discussed above, multiple applications may register DFR UI elements 300, and DFR agent 400 may determine which DFR UI elements 300 to display based on rules. To facilitate this determination, context module 450 may generate responder chains for applications that may be based on system 100 state data provided by system status module 430. The responder chain may define each application's relationship to any rules that are currently being enforced (e.g., based on which application is front most, whether a system modal event is underway, etc.). Rules module 440 may traverse the responder chain to select DFR UI elements 300 for display.

In some implementations, a responder chain may define one or more functional levels of an application. For example, an application may have a general functional level including functions that can be generally applicable throughout the application. The application may also have one or more specific functional levels including functions that are only applicable to specific application states. An application may register DFR UI elements 300 relevant to specific functional levels. For example, an email application may have a general functional level including new email creation functionality, email search functionality, and/or contact management functionality. The email application may register DFR UI elements 300 specifically relevant to the general functional level, such as a "create new email" DFR UI element 300, a "search emails" DFR UI element 300, and/or a "search contacts" DFR UI element 300. The email application may have a functional level including functionality specifically applicable when a user is working in an email editing window, including add recipient functionality, send email functionality, and/or save email functionality. The email application may register DFR UI elements 300 specifically relevant to the email editing window functional level, such as an "add recipient" DFR UI element 300, a "send email" DFR UI element 300, and/or a "save email" DFR UI element 300. The email application may have a functional level including functionality specifically applicable when a user is editing text in a dialog box, including font selection functionality, font size selection functionality, and/or font effect selection functionality. The email application may register DFR UI elements 300 specifically relevant to the text editing functional level, such as a "select font" DFR UI element 300, a "decrease font size" DFR UI element 300, and/or an "underline" DFR UI element 300.

DFR agent 400 may traverse a responder chain to arrange DFR UI elements 300 based on their relevance to a device 100 state, the results of which can be represented as an item tree. FIG. 6A is an example item tree 600. In FIG. 6A, "W->X->Y->Z" is the responder chain, A represents the current state governing the responder chain (e.g., the rules that apply based on what is happening in device 100). Each numbered block or "group" block (e.g., group Ψ, group Ω) represents a DFR UI element 300. In some examples, DFR UI elements 300 may include application controls and/or predefined fixed or flexible spaces for placement between controls. Each row represents the group of DFR UI elements 300 corresponding to a single functional level of the application.

Within each row, DFR UI elements 300 may be arranged in an ordered default set. In some cases, DFR UI elements 300 may be customizable, as discussed in greater detail below. If so, application's registration may provide a listing of DFR UI elements 300 that cannot be removed, a list of DFR UI elements 300 that are not there by default but can be added, and the ordered default set of DFR UI elements 300. This item tree 600 is presented as an example only, as responder chains may have any arrangement of functional levels and DFR UI elements 300, resulting in a variety of different item trees 600 when traversed. Also, the examples described herein assume a single responder chain for the entire DFR 112, but some embodiments may use a plurality of responder chains (e.g., a left side responder chain, a right side responder chain, and a center responder chain) to populate subsections of DFR 112, each of which may result in a separate item tree 600 when traversed.

In some implementations, DFR agent 400 may apply suppression rules when determining which DFR UI elements 300 from item tree 600 to present on the display of DFR 112. A suppression rule may be one type of rule that DFR agent 400 may apply to traverse the responder chain. Device 100 state may change as a user interacts with device 100. For example, device 100 may boot and may have no active applications with open windows. The user may open a web browser window, causing device 100 state to change. The user may click on the web browser address bar and type in it, causing device 100 state to change again. Then the user may click on the displayed website and scroll to read the website, causing device 100 state to change yet again. Each functional level in the responder chain may be more or less focused depending on the current device 100 state. A more focused functional level may be more relevant to the current device 100 state than a less focused functional level. Under one example suppression rule, DFR agent 400 may prioritize DFR UI elements 300 in more focused functional levels in the responder chain when selecting DFR UI elements 300 for display. Under another example suppression rule, DFR agent 400 may prioritize DFR UI elements 300 in less focused functional levels when selecting elements for display.

For example, when the user opens the web browser window, DFR UI elements 300 registered by the web browser may become more focused than default system DFR UI elements 300. When the user interacts with the address bar, DFR UI elements 300 registered by the web browser that are specifically relevant to the address bar (e.g., bookmarks, recently visited URLs, etc.) may become more focused than other DFR UI elements 300 registered by the web browser. When the user switches to interacting with the website, DFR UI elements 300 specific to the address bar may become less focused while DFR UI elements 300 specific to the website display (e.g., zoom, back, forward, etc.) may become more focused.

In another example, device 100 may be running an email application whose window on main display 104 includes a recipient dialog box and a message dialog box. When the user is typing in the recipient dialog box, DFR UI elements 300 relevant to that aspect of the application (e.g., address book search) may be more focused than DFR UI elements 300 relevant to the message dialog box (e.g., HTML message formatting options), which may in turn be more focused than DFR UI elements 300 unrelated to the email application (e.g., system volume controls). When the user is typing in the message dialog box, DFR UI elements 300 relevant to the message dialog box may become more focused than DFR UI elements 300 relevant to the recipient dialog box.

DFR agent 400 may use suppression to determine which DFR UI elements 300 in the responder chain should be displayed. For example, a suppression rule for any given DFR UI element 300 may have one of four different forms, suppressed by more focused items, suppressed by less focused items, and suppresses more focused items, or suppresses less focused items. Suppressed DFR UI elements 300 may have a lower priority than unsuppressed DFR UI elements 300, and DFR agent 400 may accordingly select unsuppressed DFR UI elements 300 for display, only choosing suppressed DFR UI elements 300 if there is room left over after all unsuppressed DFR UI elements 300 are chosen. For example, DFR agent 400 may enforce a suppression rule stipulating that a volume control DFR UI element 300 is suppressed by more focused items. If the user is using an email application, a contacts list DFR UI element 300 registered by the email application may be more focused than the volume control DFR UI element 300 that is not relevant to the email application. Accordingly, DFR agent 400 may select the contacts list DFR UI element 300 for display instead of the volume control DFR UI element 300. In another example, when a user is editing message text in an email application, a text underline DFR UI element 300 in the text editing functional level of a responder chain may be more focused than a send email DFR UI element 300 in a less focused message window functional level of the responder chain. DFR agent 400 may enforce a suppression rule stipulating that more focused items have priority and choose the underline DFR UI element 300 for display instead of the send email DFR UI element 300.

When a device 100 event occurs, such as a detected incoming message or a user interaction with an application, DFR agent 400 may traverse the responder chain to select DFR UI elements 300 for display. DFR agent 400 may start with DFR UI elements 300 in the functional level nearest event A in the responder chain. For example, DFR agent 400 may enforce a rule that more focused DFR UI elements 300 suppress less focused DFR UI elements 300. In the item tree 600 of FIG. 6A, DFR UI elements 300 labeled 1 and 2 are nearest event A (e.g., W may be the most focused level of the responder chain). DFR agent 400 may determine whether any of the DFR UI elements 300 in the nearest functional level are relevant to the event. If so, they may be selected. If not, DFR agent 400 may skip the nearest functional level and move to the next nearest (e.g., the second level in FIG. 6A, where X is the next most focused level of the responder chain) and perform the same analysis and selection, and so on along the item tree 600. Display assembly module 470 may generate an image comprising the selected DFR UI elements 300 and send the image to DFR 112 for display.

In another example, DFR agent 400 may enforce a rule that less focused DFR UI elements 300 suppress more focused DFR UI elements 300. In the item tree 600 of FIG. 6A, DFR UI elements 300 labeled 1 and 2 are nearest event A (e.g., W may be the least focused level of the responder chain). DFR agent 400 may determine whether any of the DFR UI elements 300 in the nearest functional level are relevant to the event. If so, they may be selected. If not, DFR agent 400 may skip the nearest functional level and move to the next nearest (e.g., the second level in FIG. 6A, where X is the next least focused level of the responder chain) and perform the same analysis and selection, and so on along the item tree 600. Display assembly module 470 may generate an image comprising the selected DFR UI elements 300 and send the image to DFR 112 for display.

Similarly, when DFR UI elements 300 from a functional level have been selected, and there is still more room for more DFR UI elements 300 on DFR 112, DFR agent 400 may continue along the item tree 600 to select additional DFR UI elements 300. Display assembly module 470 may generate an image comprising the selected DFR UI elements 300 and send the image to DFR 112 for display.

In some implementations, an item tree 600 can include placeholders for other items in the responder chain. For example, an application may also register an item called an "other items proxy," shown in FIG. 6A as the "other" blocks. The other items proxy registration may tell DFR agent 400 that if DFR UI elements 300 are placed on DFR 112 and space remains, other DFR UI elements 300 on other functional levels and/or registered by other applications may be added. The other items proxy may define the application's preferences for where the other DFR UI elements 300 may be placed in relationship to the already-added DFR UI elements 300, for example.

A functional level may allow DFR UI elements 300 from other functional levels to be placed with its own DFR UI elements 300 by including the other items proxy. If a level does not include the other items proxy, and there is space on DFR 112 for more DFR UI elements 300, DFR agent 400 may skip the level's DFR UI elements 300 altogether and move down the item tree 600. Thus, failure to register an other items proxy may be an indication that the level's elements 300 should only be displayed in situations where DFR agent 400 determines that only elements 300 for that level are relevant.

In some cases, DFR agent 400 may designate a DFR UI element 300 selected for display as a principal (e.g., centered) element 300. Applications may register DFR UI elements 300 as principal elements that should be prominently featured on DFR 112. DFR agent 400 may determine from the item tree 600 which selected DFR UI element 300 registered as principal is closest to the event in the item tree 600 and may designate that DFR UI element 300 as the principal element 300. When display assembly module 470 generates the image for display, the principal DFR UI element 300 may be centered within the image.

In other embodiments, principal DFR UI elements 300 may not necessarily be centered. For example, DFR agent 400 may enforce a rule wherein a principal DFR UI element 300 is required to appear on the left of DFR 112. Accordingly, when display assembly module 470 generates the image for display, the principal DFR UI element 300 may be placed on the left side of the image.

Figure 6B:
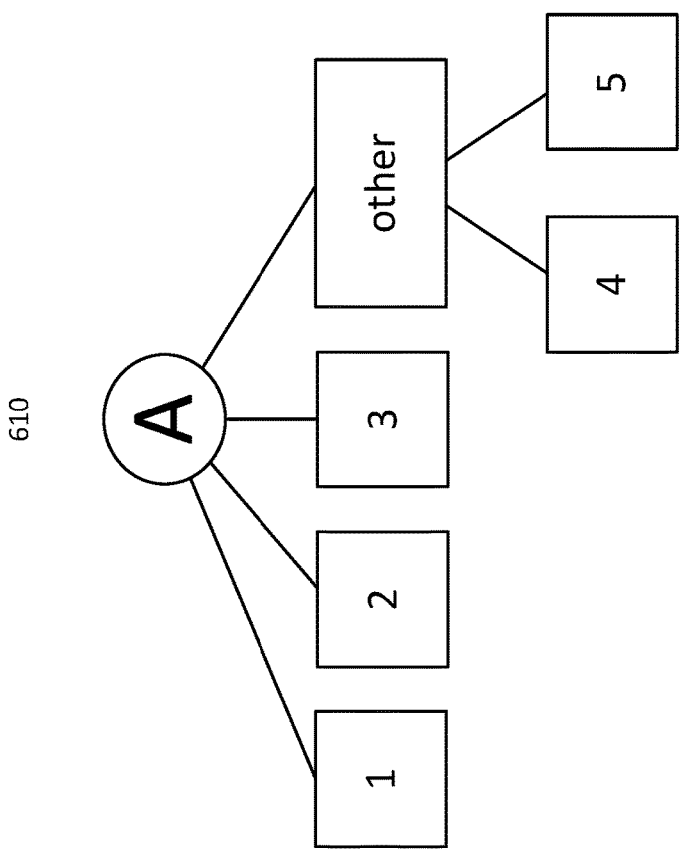
Figure 7A:
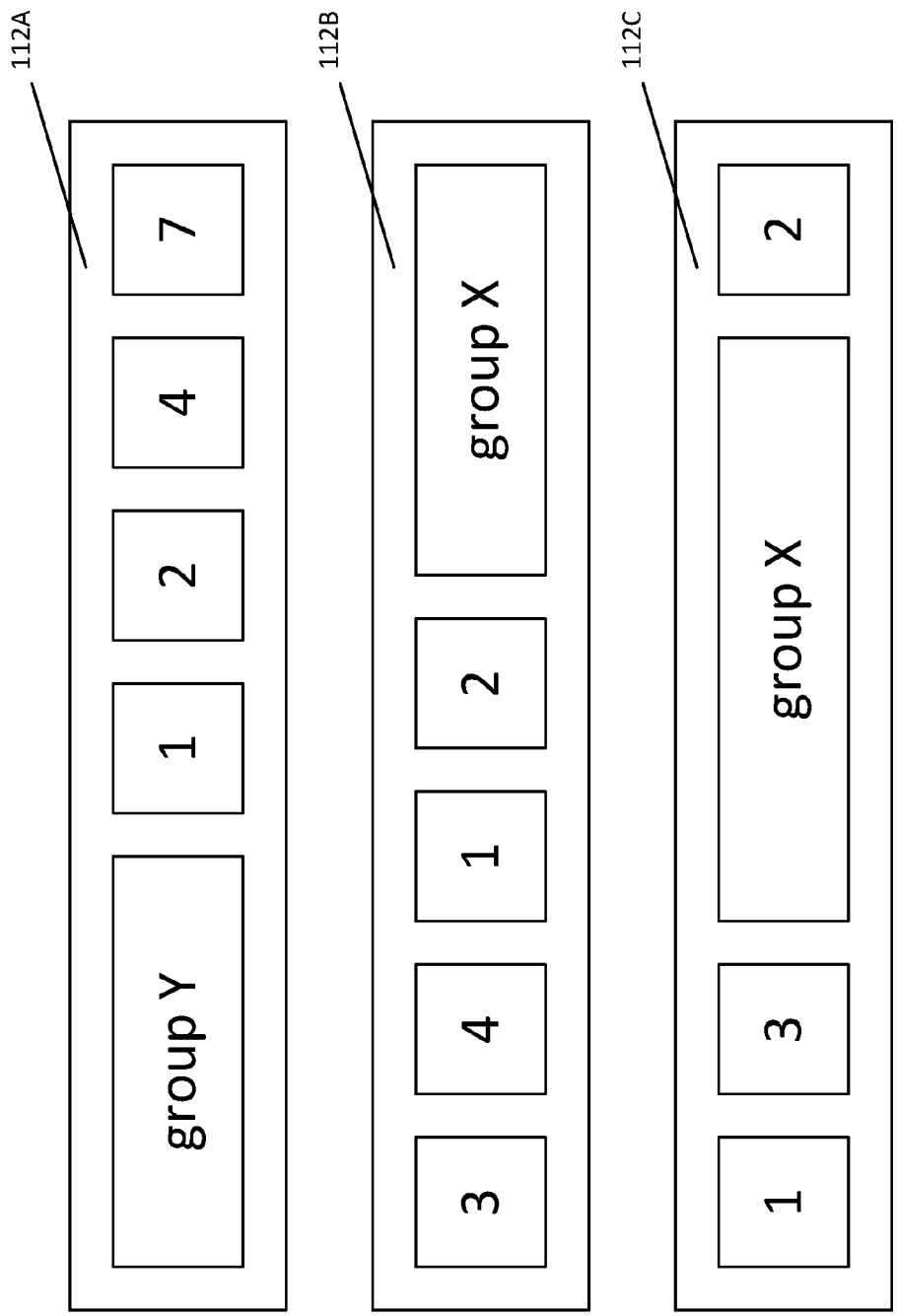
FIGS. 7A and 7B show a plurality of example DFR layouts.

FIG. 7A shows a plurality of example DFR 112 layouts that may have been formed from the item tree 600 of FIG. 6A. Layout 112A may result from DFR agent 400 traversing the responder chain and selecting every available DFR UI element 300 from the first, third, and fourth levels of the item tree 600 while skipping the second level of the item tree 600. For example, the second level may not be relevant to the event triggering layout 112A and may be suppressed. Layout 112B may result from DFR agent 400 traversing the responder chain and selecting every available DFR UI element 300 from the first and second levels of the item tree 600 and a single DFR UI element 300 from the third level of the item tree 600. For example, DFR 112 may have had space for only one more DFR UI element 300 after the first and second level DFR UI elements 300 were selected, and DFR agent 400 may have selected a most relevant or most important DFR UI element 300 from the third level of the item tree 600. Layout 112C may result from DFR agent 400 traversing the responder chain and selecting every available DFR UI element 300 from the first and second levels of the item tree 600. These layouts 112A-112C are presented as examples only. Other responder chains may produce different layouts, and even the item tree 600 of FIG. 6A may produce different layouts if different rules are applied.

In some implementations, item trees can be split and reorganized. For example, device 100 may be configured to function using a specific user language. A user may set up device 100 to display data and accept inputs in English, Spanish, Arabic, or other languages. Some languages may be read left to right, and others may be read right to left. In some implementations, DFR agent 400 may arrange DFR 112 layouts in a left to right fashion by default. When device 100 is configured to function using a right to left language, DFR agent 400 may rearrange DFR 112 layouts to be read right to left.

Figure 7B:
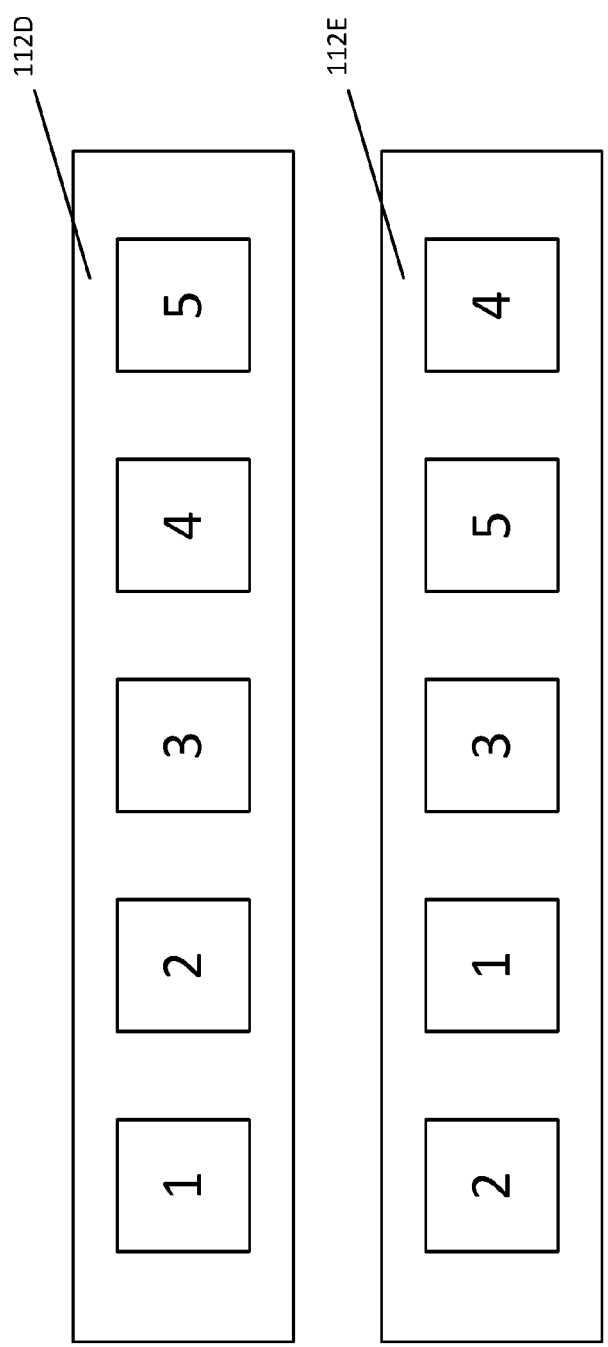

FIG. 6B is an example item tree 610. In this example, item tree 610 has two levels. The first level includes DFR UI elements 300 labeled 1, 2, and 3 nearest event A. The second level includes DFR UI elements 300 labeled 4 and 5. DFR UI element 300 labeled 3 may be the principal DFR UI element 300. FIG. 7B shows an example DFR layout 112D that may result from traversing responder chain and selecting each DFR UI element 300 in item tree 610 for display.

In order to rearrange DFR layout 112D into a right to left layout while maintaining DFR UI element 300 labeled 3 as the principal DFR UI element 300, DFR agent 400 may traverse the responder chain and then split item tree 610. FIG. 6C shows an example wherein item tree 610 has been split into three trees, item tree 610A, item tree 610B, and item tree 610C. Item tree 610B is the tree including the principal DFR UI element 300 which may remain centered on DFR 112. Item tree 610A includes DFR UI elements 300 selected for display on the left of the principal DFR UI element 300 during traversal of the responder chain. Item tree 610C includes DFR UI elements 300 selected for display on the right of the principal DFR UI element 300 during traversal of the responder chain. DFR agent 400 may process each item tree 610A-610C separately and reverse the order of DFR UI elements 300 in the left item tree 610A and right item tree 610C. DFR agent 400 may build a DFR layout by combining the reversed DFR UI elements 300 from item trees 610A and 610C on either side of the DFR UI elements 300 from item tree 610B. For example, FIG. 7B shows a DFR layout 112E that may result from item trees 610A-610C. DFR UI elements 300 in item tree 610A are reversed compared with DFR layout 112D but still appear to the left of the principal DFR UI element 300. DFR UI elements 300 in item tree 610C are reversed compared with DFR layout 112D but still appear to the right of the principal DFR UI element 300.

Contexts

Instead of using a responder chain, or in addition to using a responder chain, context module 450 may select DFR UI elements 300 based on context. A context may describe a device 100 state or activity. For example, a user interacting with a text dialog box may be a context, an application state may be a context, an internal device state may be a context, an incoming message or other event may be a context, etc. In a context-driven selection, elements 300 may be associated with specific contexts rather than responders (i.e., applications within the ordered hierarchy of a responder chain). DFR agent 400 may select DFR UI elements 300 relevant to a given context based on descriptions of DFR UI elements 300 submitted in DFR UI element 300 registration.

In some cases, several contexts may be applicable to device 100 simultaneously. Applications may register DFR UI elements 300 or groups of DFR UI elements 300 for sets of contexts, specifying selection and arrangement of DFR UI elements 300 when a given set of contexts are simultaneously present within registration metadata. Additionally, contexts may have priority levels. DFR agent 400 may prioritize some contexts over others and select DFR UI elements 300 related to the highest priority contexts first. For example, a user may be using a text editing application to type text in a document when an incoming message is received at device 100. Several contexts may apply, including a general text editing application context, a specific typing function context, and a message context. DFR agent 400 may give highest priority to the incoming message and display DFR UI elements 300 related to the message. If there is room for additional DFR UI elements 300, DFR agent 400 may select them from the next highest priority context (e.g., typing), and so on through the contexts in order of priority level. Display assembly module 470 may generate an image comprising the selected DFR UI elements 300 and send the image to DFR 112 for display.

In embodiments wherein DFR agent 400 uses both a responder chain and context to select DFR UI elements 300, each functional level's position in the responder chain, and each application's suppression rules, may be regarded as contexts and evaluated accordingly by context module 450. For example, one context may be a specific functional level's status as first responder in the chain, and another context may be a chain responder's state of being suppressed by another chain responder. Turning to FIGS. 6 and 7, DFR display 112A may result from the first level's first responder position having a highest priority context and a suppression rule causing the third level to suppress the second level, for example.

Constraints

In some implementations, DFR agent 400 may use constraints to select and/or arrange DFR UI elements 300 for display. Constraints may express relationships between DFR UI elements 300. Applying constraints may establish which elements 300 are visible and how the visible elements 300 are arranged on DFR 112. For example, constraints may define relationships such as "these three elements 300 must appear in a certain order left to right, or right to left" or "these three elements 300 must appear with at least a specified amount of space between them" or "this element 300 must appear on left" or "this element 300 must appear on right," etc. Constraints may also define an amount of fixed space or flexible (e.g., resizable) space between elements 300. Group elements 300 comprising a plurality of sub-elements may have sub-constraints specifying similar relationships for sub-elements within the group elements 300. The group elements 300 themselves may also be subject to general constraints in the same way as individual elements 300.

Constraint module 460 may select an unordered set of DFR UI elements 300 and apply a set of constraints to DFR UI elements 300 and ordered groups of DFR UI elements 300. By applying the constraints, constraint module 460 may select which DFR UI elements 300 are to be displayed in which arrangement. Display assembly module 470 may generate an image with selected DFR UI elements 300 in the arrangement defined by the constraints.

To select and arrange DFR UI elements 300 for display, DFR agent 400 may determine which constraints apply to the DFR UI elements 300 applicable to current device 100 context(s) or state, thereby establishing a constraint system. DFR agent 400 may solve for the constraints in the constraint system, attempting to satisfy constraints in the order prescribed by the responder chain or context. To solve for the constraints, DFR agent 400 may apply the first constraint in the prescribed order, selecting and arranging DFR UI elements 300 according to the first constraint. Assuming there is space for additional DFR UI elements 300, DFR agent 400 may apply the second constraint and attempt to add and arrange additional DFR UI elements 300, and so on until space is filled.

Each constraint may fall into one of at least three categories, required, optional, or custom. If a DFR UI element 300 is constrained by a required constraint, DFR agent 400 must be able to satisfy the constraint or else the DFR UI element 300 will not be displayed. If a DFR UI element 300 is constrained by an optional constraint, DFR agent 400 may attempt to satisfy the constraint but may still display the DFR UI element 300 in violation of the constraint if satisfying the constraint would conflict with another constraint (e.g., a required constraint). DFR agent 400 may handle a custom constraint similarly to an optional constraint, but the custom constraint may take precedence over an optional constraint in a conflict because the custom constraint may be user-specified and thus considered to be more important because it corresponds with the user's preferences.

Constraints may be expressed as a mix of logic and linear expressions. For example, a required constraint requiring a DFR UI element X 300 to appear on the left edge of DFR 112 may be expressed as follows: X left edge>all other left edges OR X is invisible. When DFR agent 400 solves for the constraints in a constraint system including this constraint, if the constraint cannot be satisfied, the associated DFR UI element X 300 may not be selected for display. In another example, an optional constraint requiring a DFR UI element Y 300 to appear on the left edge of DFR 112 may be expressed as follows: Y left edge>all other left edges OR difference between Y left edge and other DFR UI element's right edge as small as possible. When DFR agent 400 solves a constraint system including this constraint, if the constraint cannot be satisfied, the associated DFR UI element Y 300 may be to the right of one or more other DFR UI elements 300 as dictated by other constraints, but may be as far left as possible in view of the other constraints. Optional constraints may also include a priority value, so that optional constraints may be prioritized in the constraint system based on respective priority values. For example, if two DFR UI elements 300 have optional constraints stating they should be leftmost on DFR 112, the element 300 with the higher value may be placed to the left of the DFR UI element 300 with the lower value.

Turning to FIGS. 6A and 7A, DFR display 112C may result from solving for a constraint system wherein DFR UI element 2 has the constraint 2 right edge>all other right edges OR 2 is invisible, group element X has the constraint X right edge>all other right edges OR difference between X right edge and other element's left edge as small as possible, and DFR UI element 1 has the constraint 1 left edge>all other left edges OR 1 is invisible, for example.

Constraint-based DFR UI element 300 selection processes may function differently from the priority-based element 300 selection methods discussed above. In priority-based selection, each DFR UI element 300 may have a priority. When too many DFR UI elements 300 are available, DFR agent 400 may start with the highest priority DFR UI elements 300 and work down the priority list until a set of DFR UI elements 300 that fits DFR 112 is produced. With the constraints model, an intrinsic priority need not be supplied. Instead a constraint may define conditions under which a DFR UI element 300 is to be displayed and define whether the conditions are optional or required. DFR agent 400 may satisfy as many constraints as possible to create a set of DFR UI elements 300 that fits DFR 112.

Command Processing

DFR agent 400 may use the arrangement of DFR UI elements 300 on DFR 112 to process commands input using the DFR 112 touch interface. When a user touches DFR 112, input module 480 may receive data indicating the specific touch location from DFR 112. Display assembly module 470 may supply data to input module 480 indicating which DFR UI element 300 is at the location that was touched. Thus, input module 480 may correlate the touch location with the related DFR UI element 300. After determining the related DFR UI element 300, input module 480 may determine which application needs to know about the touch event. For example, input module 480 may determine which application registered the DFR UI element 300 and determine the appropriate API of the registering application. Input module 480 may invoke the appropriate API to deliver the command to the application. Since multiple applications may have DFR UI elements 300 on display at once, DFR agent 400 may deliver event notifications to each application separately.

DFR agent 400 may place individual DFR UI elements 300 into individual regions of DFR 112 to allow tracking of which DFR UI element 300 is pressed by a user. For example, once DFR agent 400 has selected DFR UI elements 300 for display, DFR agent 400 may partition DFR 112 into regions and put each DFR UI element 300 into a separate region. The shape of each region may provide metadata indicating how to interpret touches that come in. Regions may be composited into an image and rendered on DFR 112. The rendered image may be sent to DFR 112 or elsewhere (e.g., window on screen for simulation, movie capture for recording, one frame sent to file as screen capture, etc.). The regions may also enable debugging. For example, in a debug mode, DFR agent 400 may cause DFR 112 to overlay text saying which DFR UI element 300 is associated with which application to allow a user to see at a glance which applications are participating in which areas of the DFR 112. Debugging may be performed without affecting the functionality of the DFR 112 and without the applications being aware of debug mode.

Customization

FIG. 8 shows an example DFR layout editor interface 800. Device 100 may include an application for customizing DFR 112 displays. For example, a user may enter a DFR customization mode, wherein the user may place and arrange DFR UI elements 300 within DFR 112. In DFR customization mode, device 100 may display a palette 802 on main display 104. Palette 802 may include DFR UI elements 300 that may be put into DFR 112. Using an input device such as a mouse or touch pad, user may select one or more DFR UI elements 300 in palette 802 and drag them from main display 104 to DFR 112 in some embodiments. While device 100 is in DFR customization mode, a user may also be able to select one or more DFR UI elements 300 being displayed on DFR 112 and drag them to other positions on DFR 112. User may also be able to drag one or more DFR UI elements 300 off DFR 112, either removing them altogether or dragging them to main display 104. In other embodiments, main display 104 may also display a virtual DFR into which the user may drag DFR UI elements 300. In the example of FIG. 8, user has dragged DFR UI elements 300-1, 300-2, 300-3, and group DFR UI element 300-X and positioned them on DFR 112 or virtual DFR as desired. Palette 802 may include one or more default sets 806 of DFR UI elements 300. To restore DFR 112 to a default display, user may drag an entire default set 806 to DFR 112.

The contents of palette 802 may be dictated by the current state of device 100. For example, if the user is using an email application and enters customization mode, DFR UI elements 300 in palette 802 may include DFR UI elements 300 registered by email application and generally applicable system DFR UI elements (e.g., DFR UI elements 300 for system-wide controls such as audio volume, spacer elements, etc.). In some embodiments, user may be able to customize DFR 112 for a system default state as well, using the same interface 800. Customization module 420 may store a user's edits for a state and, when the state is encountered again, DFR agent 400 may generate a display image for DFR 112 including the user's edits. For example, rules module 440 may apply a rule that user edits take precedence over defaults, or constraint module 460 may prioritize constraints that correspond to the user's edits.

Group DFR UI elements 300 may also be customizable through interface 800. User may select a group for customization and drag DFR UI elements 300 into or out of the group and arrange the DFR UI elements 300 within the group. If multiple applications or events use the customized group, the customizations may be present every time the group is used.

Customization may provide flexibility to the user, but placement of DFR UI elements 300 on DFR 112 may still be governed by rules and/or constraints as described above. Interface 800 may reject any user changes that violate rules or constraints. For example, if DFR UI element 1 is required to be on the left of DFR 112, user may be unable to drag DFR UI element 3 to the left of DFR UI element 1. Some groups or DFR 112 layouts may be marked or registered as customizable and/or others may not be, or vice versa. As mentioned above, an application's registration may provide a listing of DFR UI elements 300 that cannot be removed. In this case, a rule may prevent a user from removing a DFR UI elements 300 that is not removable. Rules can be prescribed that prevent splitting DFR UI elements 300 or breaking up grouped DFR UI elements 300 when customizing. For example, a user may be restricted from placing a DFR UI element 300 between an audio volume up DFR UI element 300 and an audio volume down DFR UI element 300. Thus, only groups or layouts that are allowed to be customized may be edited in interface 800.

Example Processes

Figure 9:
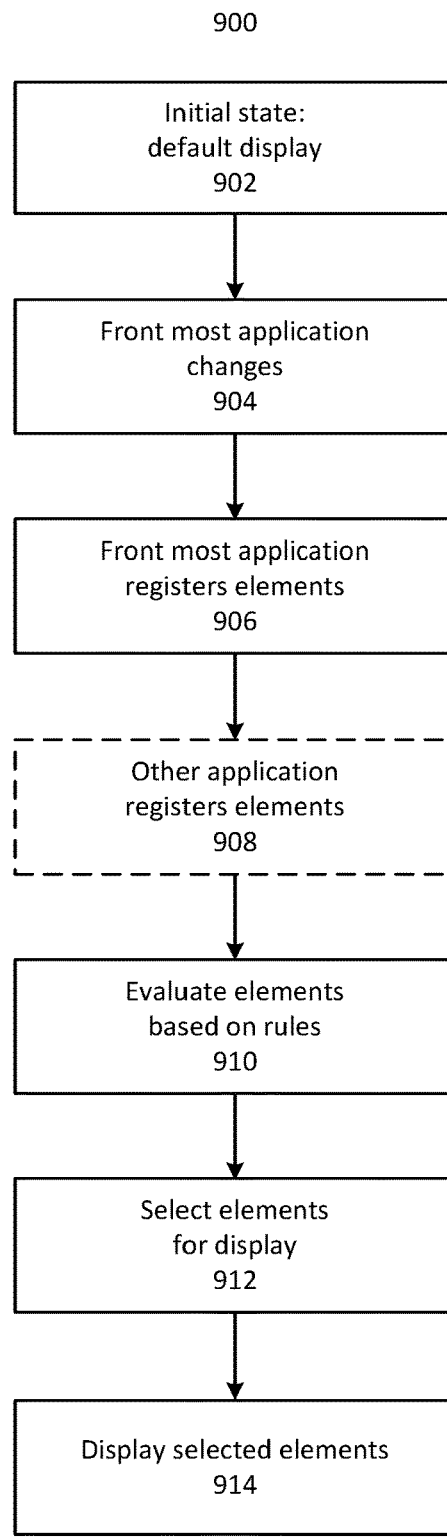
FIG. 9 is a flow diagram of an example DFR image generation process based on front most application.

FIG. 9 is a flow diagram of an example DFR image generation process 900 based on front most application. For example, process 900 can be performed by computing device 100 to generate an image for display on DFR 112 in response to a change in state of device 100.

At step 902, computing device 100 can present default graphical elements on DFR 112. For example, upon device 100 startup or when no applications are active, DFR agent 400 may send default display data (e.g., an image comprising system DFR UI elements 300 such as audio volume controls, screen brightness controls, escape key, etc.) to DFR 112. Specifically, as described above, system status module 430 may determine device 100 state (i.e., no active applications). DFR agent 400 may use the state to select and arrange DFR UI elements 300 for display based on rules, context, and/or constraints. When no applications are active, no DFR UI elements 300 may be registered, so DFR agent 400 may choose DFR UI elements 300 from among available system DFR UI elements 300 (e.g., screen brightness, volume wireless network toggle, etc.). Display assembly module 420 may send an image comprising selected DFR UI elements 300 to DFR 112. Process 900 starts from a default display in this example, but in some cases, DFR 112 may be displaying images relevant to a specific device 100 application or state in this step. For example, when one or more applications are running and have registered DFR UI elements 300, DFR agent 400 may select one or more registered DFR UI elements 300 and/or one or more system DFR UI elements 300 as described above.

At step 904, computing device 100 can detect that the front most application has changed. For example, a user may start working in a new application or select an open window on display 104 as a primary window. In FIG. 5A, app #1 is the front most application. In FIG. 5B, app #2 is the front most application. DFR agent 400 can receive state data from the operating system of computing device 100 indicating that the front most application (e.g., the application that currently has user input focus) has changed from a first application to a second application.

At step 906, computing device 100 can receive registration data for one or more DFR UI elements 300 from the front most application. For example, the front most application may register elements 300 with DFR agent 400. For example, if the user is actively using a web browser, the web browser may register DFR UI elements 300 with controls for address bar, reload, bookmark, forward, backward, new tab, history, and/or download.

At step 908, computing device 100 can receive registration data for one or more DFR UI elements 300 from other applications running on computing device 100. For example, other applications may register elements 300 with DFR agent 400. For example, if the user has started a media player and is running the media player in the background (and the web browser in the foreground), media player may register DFR UI elements 300 with controls for media playback and selection.

At step 910, computing device 100 may evaluate registered DFR UI elements 300 based on element selection rules. In some implementations, DFR agent 400 may evaluate the registered DFR UI elements 300 based on rules as described above in the Element Selection section. For example, the web browser may be a whitelisted application allowed to take over the entire DFR 112.

At step 912, DFR agent 400 may select DFR UI elements 300 for display based on the rules. In the example wherein the web browser is whitelisted, DFR agent 400 may select only DFR UI elements 300 registered by the web browser and exclude DFR UI elements 300 registered by the media player.

At step 914, DFR agent 400 may generate an image (e.g., a bitmap, as described above) including the selected DFR UI elements 300 and send the image to DFR 112. DFR 112 may display the image.

Figure 10:
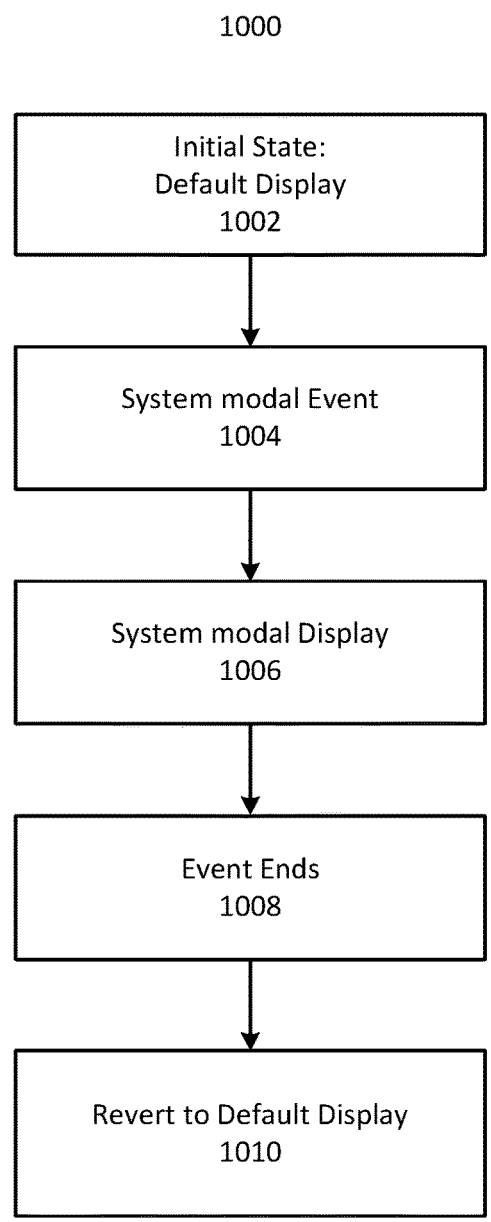
FIG. 10 is a flow diagram of an example DFR image generation process based on system priority event.

FIG. 10 is a flow diagram of an example DFR image generation process 1000 based on a system priority event occurrence. For example, process 1000 can be performed by computing device 100 to display an image on DFR 112 in response to a system modal event and return to displaying a previous image when the system modal event ends.

At step 1002, computing device 100 can present default graphical elements on DFR 112. For example, upon device 100 startup or when no applications are active, DFR agent 400 may send default display data (e.g., an image comprising system DFR UI elements 300) to DFR 112. Specifically, as described above, system status module 430 may determine device 100 state (i.e., no active applications). DFR agent 400 may use the state to select and arrange DFR UI elements 300 for display based on rules, context, and/or constraints. When no applications are active, no DFR UI elements 300 may be registered, so DFR agent 400 may choose DFR UI elements 300 from among available system DFR UI elements 300 (e.g., screen brightness, volume wireless network toggle, etc.). Display assembly module 420 may send an image comprising selected DFR UI elements 300 to DFR 112. Process 1000 starts from a default display in this example, but in some cases, DFR 112 may be displaying images relevant to a specific device 100 application or state in this step. For example, when one or more applications are running and have registered DFR UI elements 300, DFR agent 400 may select one or more registered DFR UI elements 300 and/or one or more system DFR UI elements 300 as described above.

At step 1004, a system priority event may occur. For example, device 100 may receive an incoming message, user may press a display F-keys button, etc. As shown in FIGS. 5B-5C, the system priority event may be unrelated to the application in which the user is working. For example, in FIG. 5B, the user is working in app #2, and DFR 112 is displaying app #2 DFR UI element 302. In FIG. 5C, after the occurrence of a system priority event, DFR 112 is displaying system priority DFR UI element 305, despite the fact that the user is still working in app #2. In the example of FIG. 10, the system priority event is a system modal event, such as an incoming message notification that the user must answer or dismiss before taking any further actions.

At step 1006, DFR agent 400 may generate an image (e.g., a bitmap, as described above) including DFR UI elements 300 specified for display in response to the system modal event and send the image to DFR 112. DFR 112 may display the image.

At step 1008, the system priority event may end. For example, an incoming message may be answered, the user may release the function row key, the user may dismiss the message notification, etc.

At step 1010, DFR agent 400 may restore the DFR 112 display that had been active prior to the system modal event. In some implementations, DFR agent 400 may perform restoration automatically because once the system priority event ends, system 100 may return to the state it was in prior to the event. Thus, DFR agent 400 may generate a display image according to the same rules, contexts, and/or constraints it used before. In this example the restored display is a default display, but if a state-specific display had been on DFR 112 (e.g., a display generated according to process 900), it may be restored in the same manner. However, if the state of the device 100 undergoes additional changes during the event (e.g., a user starts working in a new application, causing the new application to be front most), DFR agent 400 may generate a display image according to the new state upon event ending. For example, DFR agent 400 may select DFR UI elements 300 registered by the new front most application, rather than DFR UI elements 300 that had been displayed prior to the user working in the new front most application.

Figure 11:
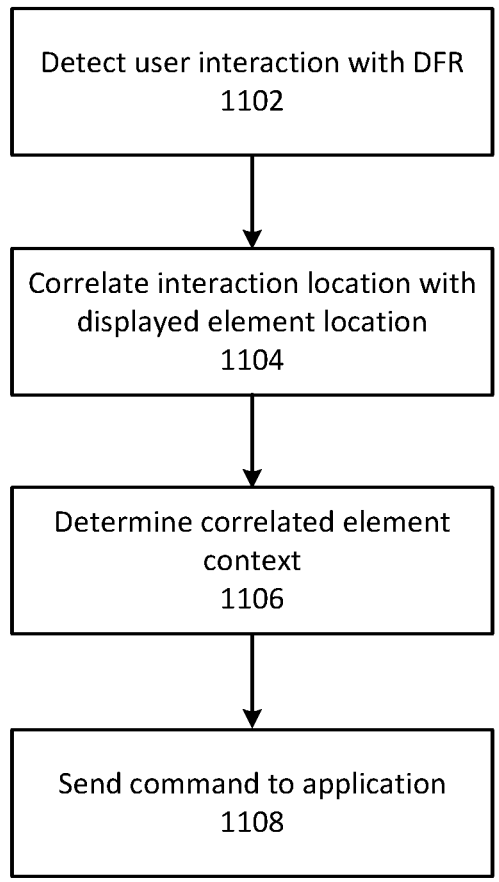
FIG. 11 is a flow diagram of an example process for detecting and routing DFR inputs.

FIG. 11 is a flow diagram of an example process 1100 for detecting and routing DFR inputs. For example, computing system 100 may perform process 1100 when DFR 112 is displaying an image and a user enters a command by touching the image.

At step 1102, DFR 112 may detect a command entered by a user touching DFR 112. DFR 112 may send metadata indicating the location of the touch to DFR agent 400.

At step 1104, DFR agent 400 may correlate the touch location with the DFR UI element 300 displayed at that location. For example, turning to FIG. 5D, if location metadata indicates the touch was registered at the left side of DFR 112, DFR agent 400 may correlate the touch with DFR UI element 304. If location metadata indicates the touch was registered at the right side of DFR 112, DFR agent 400 may correlate the touch with DFR UI element 305. If location metadata indicates the touch was registered at the center of DFR 112, DFR agent 400 may correlate the touch with DFR UI element 303.

At step 1106, DFR agent 400 may determine the meaning of a selection of the correlated DFR UI element 300. For example, if DFR agent 400 determines that the selected DFR UI element 300 is a "volume up" element, DFR agent 400 may determine that the system volume control application may need to receive a volume up command. If DFR agent 400 determines that the selected DFR UI element 300 is an "answer call" element, DFR agent 400 may determine that a messaging application may need to receive an answer call command.

At step 1108, DFR agent 400 may send the command to the appropriate application. For example, DFR agent 400 may call the appropriate application API corresponding to the command as described above. Accordingly, DFR agent 400 may perform initial processing of DFR 112 commands, providing a layer of abstraction between DFR 112 and device 100 applications.

Figure 12:
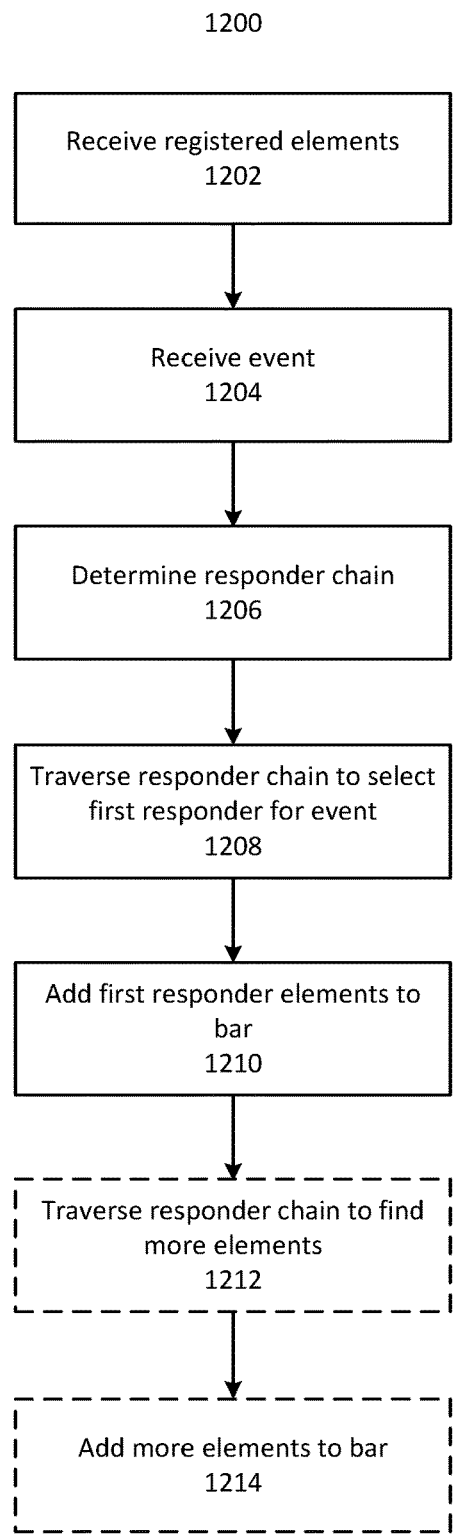
FIG. 12 is a flow diagram of an example process for selecting DFR elements.

FIG. 12 is a flow diagram of an example process 1200 for selecting DFR UI elements using a responder chain 600. For example, computing system 100 may perform process 1200 to traverse a responder chain 600 and thereby select DFR UI elements 300 for display.

At step 1202, DFR agent 400 may receive registered DFR UI elements 300 from at least one application running on device 100. For example, a user may be working in an email application, and the email application may register a plurality of DFR UI elements 300. In some implementations, DFR agent 400 may initially display the registered DFR UI elements 300 in a default startup order for the application. For example DFR agent 400 may select general functional level DFR UI elements 300 for initial display.

At step 1204, DFR agent 400 may receive data indicating an event has occurred or device 100 state has changed. For example, the user may start working in a specific portion of the application. The user may open an email editing window and/or start typing in an email message composition box, for example.

At step 1206, DFR agent 400 may determine a responder chain 600 relevant to the event. DFR agent 400 may arrange functional levels and/or DFR UI elements 300 within the responder chain 600 in order of distance from the event. For example, if the user is typing in the message composition box, text editing functional level DFR UI elements 300 may be most focused and therefore closest to the event in the responder chain 600. DFR UI elements 300 for the email window functional level may be the next most focused and may come next in the responder chain 600. General functional level DFR UI elements 300 for the email application may be least focused and may come last in the responder chain 600.

At step 1208, DFR agent 400 may traverse the responder chain 600 to find the first responder for the event. For example, in FIG. 6A, the first level containing DFR UI elements 1 and 2 may be the first responder for event A.

At step 1210, DFR agent 400 may add first responder DFR UI elements 300 to the DFR image, as described above. For example, in DFR display 112B of FIG. 7A, DFR UI elements 1 and 2 are placed in the center of DFR 112.

At step 1212, if the first responder DFR UI elements 300 do not fill the DFR image, DFR agent 400 may traverse the responder chain 600 further to find additional DFR UI elements 300 for display. For example, DFR agent 400 may traverse responder chain 600 of FIG. 6A and select DFR UI elements 3, 4, and group element X.

At step 1214, DFR agent 400 may add the additional DFR UI elements 300 to the image. For example, in DFR display 112B of FIG. 7A, DFR UI elements 3, 4, and group element X are placed on either side of elements 1 and 2 in DFR 112. As described above, DFR agent 400 may generate the image and send it to DFR 112 for display.

Figure 13:
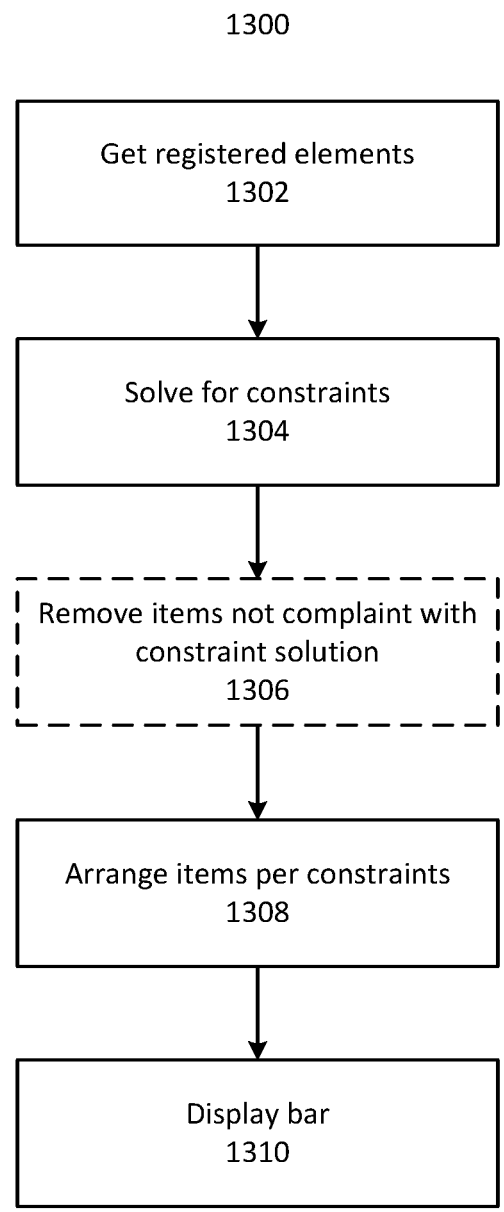
FIG. 13 is a flow diagram of an example process for selecting DFR elements in compliance with one or more constraints.

FIG. 13 is a flow diagram of an example process 1300 for selecting DFR elements in compliance with one or more constraints. For example, computing system 100 may perform process 1300 to satisfy one or more constraints and thereby select DFR UI elements 300 for display.

At step 1302, DFR agent 400 may receive registered DFR UI elements 300 from applications running on device 100.

At step 1304, DFR agent 400 may examine the registered DFR UI elements 300 to identify constraints registered for the elements 300 and solve for the constraints as described above. For example, turning to FIG. 7A, DFR display 112A may result from solving for a constraint system wherein DFR UI element 3 has the constraint 3 right edge>all other right edges OR 3 is invisible, group DFR UI element Y has the constraint Y left edge>all other left edges OR difference between Y left edge and other DFR UI element's right edge as small as possible, and DFR UI element 7 has the constraint 7 right edge>all other right edges OR 7 is invisible.

At step 1306, DFR agent 400 may discard DFR UI elements 300 that cannot be displayed due to constraints, if necessary. For example, in FIG. 7A, the constraint on DFR UI element 3 conflicts with the constraint on DFR UI element 7. The DFR UI element 7 constraint may have a higher priority than the DFR UI element 3 constraint, so DFR UI element 3 may be discarded.

At step 1308, DFR agent 400 may arrange remaining DFR UI elements 300 according to the constraints. DFR agent 400 can generate an image including the DFR UI elements 300 in the determined arrangement.

At step 1310, DFR agent 400 may send the image to DFR 112 for display.

Graphical User Interfaces

This disclosure above describes various GUIs for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 14:
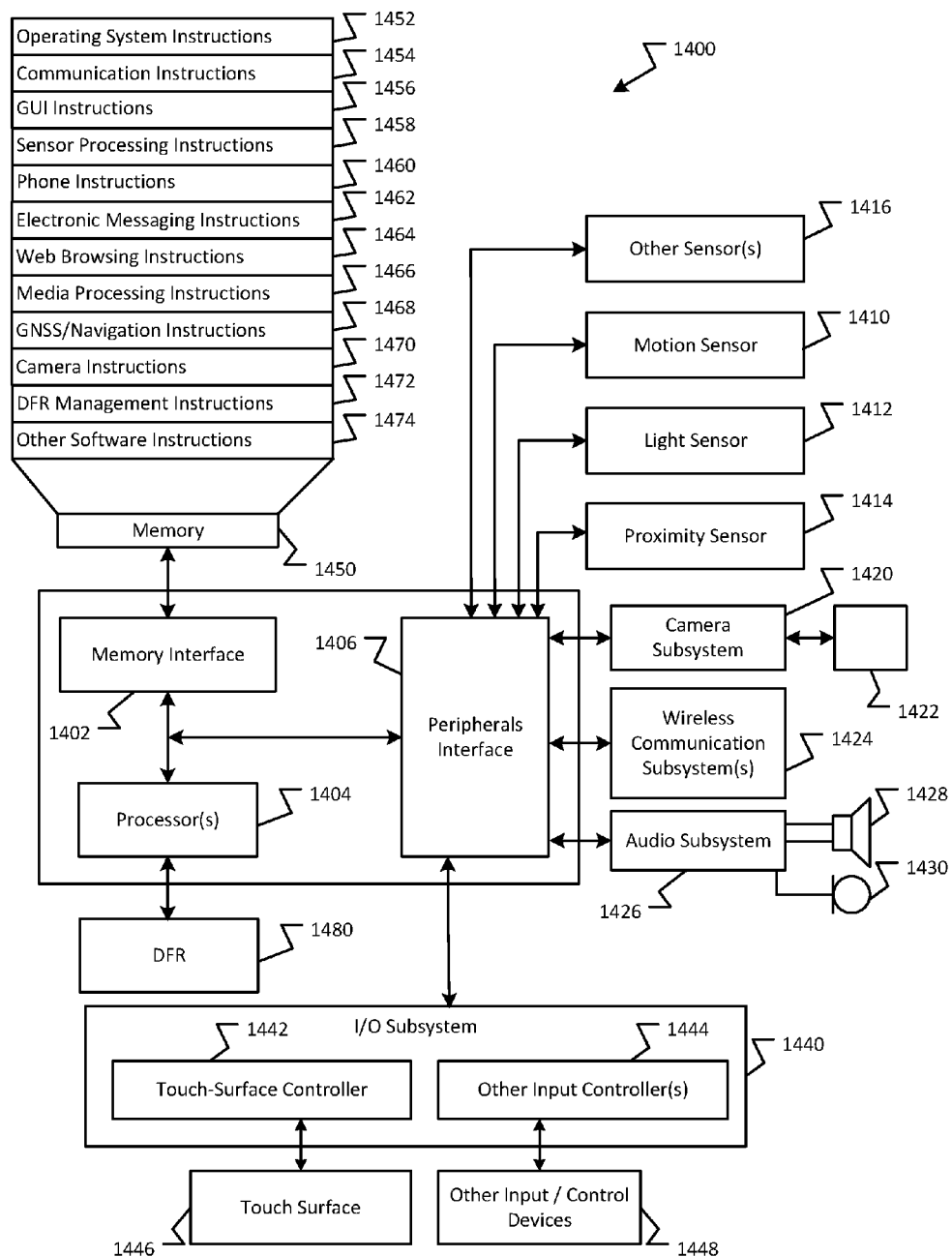
FIG. 14 is a block diagram of an example system architecture implementing the features and processes of FIGS. 1-14.

FIG. 14 is a block diagram of an example computing device 1400 that can implement the features and processes of FIGS. 1-13. The computing device 1400 can include a memory interface 1402, one or more data processors, image processors and/or central processing units 1404, and a peripherals interface 1406. For example, the one or more processors 1404 may include main processor 202 and secondary processor 204. The memory interface 1402, the one or more processors 1404, and/or the peripherals interface 1406 can be separate components or can be integrated in one or more integrated circuits. The various components in the computing device 1400 can be coupled by one or more communication buses or signal lines.

Sensors, devices, and subsystems can be coupled to the peripherals interface 1406 to facilitate multiple functionalities. For example, a motion sensor 1410, a light sensor 1412, and a proximity sensor 1414 can be coupled to the peripherals interface 1406 to facilitate orientation, lighting, and proximity functions. Other sensors 1416 can also be connected to the peripherals interface 1406, such as a global navigation satellite system (GNSS) (e.g., GPS receiver), a temperature sensor, a biometric sensor, magnetometer or other sensing device, to facilitate related functionalities.

A camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips. The camera subsystem 1420 and the optical sensor 1422 can be used to collect images of a user to be used during authentication of a user, e.g., by performing facial recognition analysis.

Communication functions can be facilitated through one or more wireless communication subsystems 1424, which can include radio frequency receivers and transmitters and/or optical (e.g., infrared) receivers and transmitters. The specific design and implementation of the communication subsystem 1424 can depend on the communication network(s) over which the computing device 1400 is intended to operate. For example, the computing device 500 can include communication subsystems 1424 designed to operate over a GSM network, a GPRS network, an EDGE network, a Wi-Fi or WiMax network, and a Bluetooth™ network. In particular, the wireless communication subsystems 1424 can include hosting protocols such that the device 1400 can be configured as a base station for other wireless devices.

An audio subsystem 1426 can be coupled to a speaker 1428 and a microphone 51430 to facilitate voice-enabled functions, such as speaker recognition, voice replication, digital recording, and telephony functions. The audio subsystem 1426 can be configured to facilitate processing voice commands, voiceprinting and voice authentication, for example.

The I/O subsystem 1440 can include a touch-surface controller 1442 and/or other input controller(s) 51444. The touch-surface controller 1442 can be coupled to a touch surface 1446. The touch surface 1446 and touch-surface controller 1442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1446.

The other input controller(s) 1444 can be coupled to other input/control devices 1448, such as one or more buttons, rocker switches, thumb-wheel, infrared port, USB port, and/or a pointer device such as a stylus. The one or more buttons (not shown) can include an up/down button for volume control of the speaker 1428 and/or the microphone 1430.

In one implementation, a pressing of the button for a first duration can disengage a lock of the touch surface 1446; and a pressing of the button for a second duration that is longer than the first duration can turn power to the computing device 1400 on or off. Pressing the button for a third duration can activate a voice control, or voice command, module that enables the user to speak commands into the microphone 1430 to cause the device to execute the spoken command. The user can customize a functionality of one or more of the buttons. The touch surface 1446 can, for example, also be used to implement virtual or soft buttons and/or a keyboard.

The computing device 1100 can include a DFR 1180. DFR 1180 may include a touch sensitive display, display controller, touch input controller, and/or other hardware configured to display a GUI and receive commands from user interaction with the GUI.

In some implementations, the computing device 1400 can present recorded audio and/or video files, such as MP3, AAC, and MPEG files. In some implementations, the computing device 1400 can include the functionality of an MP3 player, such as an iPod™. The computing device 1400 can, therefore, include a 36-pin connector that is compatible with the iPod. Other input/output and control devices can also be used.

The memory interface 1402 can be coupled to memory 1450. The memory 1450 can include high-speed random access memory and/or non-volatile memory, such as one or more magnetic disk storage devices, one or more optical storage devices, and/or flash memory (e.g., NAND, NOR). The memory 1450 can store an operating system 1452, such as Darwin, RTXC, LINUX, UNIX, OS X, WINDOWS, or an embedded operating system such as VxWorks.

The operating system 1452 can include instructions for handling basic system services and for performing hardware dependent tasks. In some implementations, the operating system 1452 can be a kernel (e.g., UNIX kernel). In some implementations, the operating system 1452 can include instructions for performing voice authentication. For example, operating system 1452 can implement the DFR features as described with reference to FIGS. 1-13.

The memory 1450 can also store communication instructions 1454 to facilitate communicating with one or more additional devices, one or more computers and/or one or more servers. The memory 1450 can include graphical user interface instructions 1456 to facilitate graphic user interface processing; sensor processing instructions 1458 to facilitate sensor-related processing and functions; phone instructions 1460 to facilitate phone-related processes and functions; electronic messaging instructions 1462 to facilitate electronic-messaging related processes and functions; web browsing instructions 1464 to facilitate web browsing-related processes and functions; media processing instructions 1466 to facilitate media processing-related processes and functions; GNSS/Navigation instructions 1468 to facilitate GNSS and navigation-related processes and instructions; and/or camera instructions 1470 to facilitate camera-related processes and functions.

The memory 1450 can store DFR management instructions 1472 to facilitate other processes and functions, such as the DFR processes and functions as described with reference to FIGS. 1-13.

The memory 1450 can also store other software instructions 1474, such as web video instructions to facilitate web video-related processes and functions; and/or web shopping instructions to facilitate web shopping-related processes and functions. In some implementations, the media processing instructions 1466 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1450 can include additional instructions or fewer instructions. Furthermore, various functions of the computing device 1400 can be implemented in hardware and/or in software, including in one or more signal processing and/or application specific integrated circuits.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
  instantiating, by at least one processor of a device comprising a keyboard having a dynamic function row (DFR), a DFR agent, wherein the DFR comprises a touchscreen distinct from a main display of the device;
  receiving, at the DFR agent, a plurality of registrations from at least one application running on the device, each registration specifying image data for at least one registered element configured to be displayed on the DFR from an application;
  registering, by the DFR agent, the plurality of registrations by storing, in a memory of the device, the image data for each registered element in association with indication of a corresponding application;
  selecting, by the DFR agent, one or more registered elements from the at least one application running on the device that are relevant to a current state of the device;
  arranging, by the DFR agent, the selected one or more registered elements into an interface;
  generating, by the DFR agent, an image of the interface; and
  displaying, by the DFR, the image.

2. The method of claim 1, wherein a first of the selected one or more registered elements are registered by a front most application that is currently active on the main display of the device.

3. The method of claim 2, wherein a second of the selected one or more registered elements are registered by an application other than the front most application.

4. The method of claim 3, wherein the selecting the one or more registered elements comprises determining the selected one or more registered elements that are registered by an application other than the front most application based on an application priority.

5. The method of claim 1, wherein at least one of the selected one or more registered elements are registered by an application that is currently processing an event that has been predetermined to be a system priority event.

6. The method of claim 1, further comprising sending, by the DFR agent, sizing information for elements to be displayed on the DFR to the at least one application prior to receiving the plurality of registrations, wherein the DFR agent, rather than the at least one application, determines sizing and placement of the selected one or more registered elements in generating the image.

7. The method of claim 1, further comprising:
displaying a user interface configured to receive user input to customize a default image for display on the DFR;
receiving the user input via the user interface to customize the default image for display on the DFR when a current state of the device is a default state; and
determining that the current state of the device is the default state,
and
wherein the image comprises the default image in response to a determination that the current state of the device is the default state.

8. The method of claim 1, wherein the current state of the device is based on a predefined event, wherein the image comprises a predefined image associated with the predefined event and wherein the predefined image provides one or more registered DFR elements configured to address the predefined event prior to continuing use of an application associated with the predefined event.

9. The method of claim 1, further comprising:
detecting, at the DFR agent, a new state of the device;
determining, by the DFR agent, that the new state of the device necessitates display of a new image on the DFR;
generating, by the DFR agent, the new image to display on the DFR based on the new state of the device; and
displaying, by the DFR, the new image.

10. The method of claim 1, wherein the DFR agent receives more than one distinct element for display on the DFR from the at least one application, and wherein the selected one or more registered elements include the more than one distinct element of the at least one application.

11. The method of claim 1, wherein presentation of the selected one or more registered elements within the image is further based on a user preference.

12. The method of claim 1, further comprising:
defining, by the DFR agent, at least one region of the image, the at least one region corresponding to an application command;
receiving, by the DFR, a touch input at an area of the touchscreen corresponding to the at least one region;
detecting, by the DFR agent, the application command based on the touch input; and
sending, by the DFR agent, the application command to at least one application.

13. A device comprising:
a keyboard having a dynamic function row (DFR) comprising a touchscreen;
a main display distinct from the DFR; and
at least one processor configured to:
instantiate a DFR agent;
receive a plurality of registrations from at least one application running on the device, each registration specifying image data for at least one registered element configured to be displayed on the DFR from an application;
register the plurality of registrations by storing, in a memory of the device, the image data for each registered element in association with indication of a corresponding application;
select one or more registered elements from the at least one application running on the device that are relevant to a current state of the device;
arrange the selected one or more registered elements into an interface;
generate an image of the interface; and
display the image on the DFR.

14. The device of claim 13, wherein a first of the selected one or more registered elements are registered by a front most application that is currently active on the main display of the device.

15. The device of claim 14, wherein a second of the selected one or more registered elements are registered by an application other than the front most application.

16. The device of claim 15, wherein selecting the one or more registered elements comprises determining the selected one or more registered elements that are registered by an application other than the front most application based on an application priority.

17. The device of claim 13, wherein at least one of the selected one or more registered elements are registered by an application that is currently processing an event that has been predetermined to be a system priority event.

18. The device of claim 13, wherein the at least one processor is further configured to send sizing information for elements to be displayed on the DFR to the at least one application prior to receiving the plurality of registrations, and wherein the DFR agent, rather than the at least one application, determines sizing and placement of the selected one or more registered elements in generating the image.

19. The device of claim 13, wherein the current state of the device is a default state, and wherein the image comprises a default image.

20. The device of claim 13, wherein the current state of the device is based on a predefined event, and wherein the image comprises a predefined image associated with the predefined event, and wherein the predefined image provides one or more registered DFR elements configured to address the predefined event prior to continuing use of an application associated with the predefined event.

21. The device of claim 13, wherein the at least one processor is further configured to:
detect a new state of the device;
determine that the new state of the device necessitates display of a new image on the DFR;
generate the new image to display on the DFR based on the new state of the device; and
display the new image on the DFR.

22. The device of claim 13, wherein the at least one processor receives more than one distinct element for display on the DFR from the at least one application, and wherein the selected one or more registered elements include the more than one distinct element of the at least one application.

23. The device of claim 13, wherein presentation of the selected one or more registered elements within the image is further based on a user preference.

24. The device of claim 13, wherein the processor is further configured to define, by the DFR agent, at least one region of the image, the at least one region corresponding to an application command,
    wherein the DFR is further configured to receive a touch input at an area of the touchscreen corresponding to the at least one region, and
    wherein the processor is further configured to:
        detect, by the DFR agent, the application command based on the touch input; and
        send, by the DFR agent, the application command to at least one application.

* * * * *